(12) United States Patent
Yamazaki et al.

(10) Patent No.: US 6,747,289 B2
(45) Date of Patent: Jun. 8, 2004

(54) SEMICONDUCTOR DEVICE AND METHOD OF FABRICATING THEREOF

(75) Inventors: Shunpei Yamazaki, Tokyo (JP); Hideomi Suzawa, Kanagawa (JP); Koji Ono, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 37 days.

(21) Appl. No.: 09/841,537

(22) Filed: Apr. 24, 2001

(65) Prior Publication Data

US 2001/0035526 A1 Nov. 1, 2001

(30) Foreign Application Priority Data

Apr. 27, 2000 (JP) ........................... 2000-128526

(51) Int. Cl.$^7$ ................................. H01L 29/04
(52) U.S. Cl. .................... 257/59; 257/72; 257/632; 257/643
(58) Field of Search ................ 257/59, 72, 632, 257/642, 643, 741, 771

(56) References Cited

U.S. PATENT DOCUMENTS

| | | | |
|---|---|---|---|
| 6,013,930 A | * | 1/2000 | Yamazaki et al. .......... 257/353 |
| 6,031,290 A | | 2/2000 | Miyazaki et al. |
| 6,208,395 B1 | * | 3/2001 | Kanoh et al. ............... 349/113 |
| 2001/0040655 A1 | | 11/2001 | Yamazaki et al. .......... 349/110 |

FOREIGN PATENT DOCUMENTS

| | | |
|---|---|---|
| JP | 06-148685 | 5/1994 |
| JP | 07-235680 | 9/1995 |
| JP | 08-274336 | 10/1996 |
| JP | 9-054318 | 2/1997 |
| JP | 10-073813 | 3/1998 |
| JP | 11-258596 | 9/1999 |

OTHER PUBLICATIONS

JP 06–148685 English abstract, May 1994.
JP 07–235680 English abstract, Sep. 1995.
JP 08–274336 English abstract, Oct. 1996.
JP 6–148685 full English translation, May 1994.
JP 7–235680 full English translation, Sep. 1995.
JP 8–274336 full English translation, Oct. 1996.
English Abstract re Japanese Patent Application No. JP 10–073813 published Mar. 17, 1998.
Full English translation re Japanese Patent Application No. JP 9–054318, published Feb. 25, 1997.

* cited by examiner

Primary Examiner—Mark V. Prenty
(74) Attorney, Agent, or Firm—Cook, Alex, McFarron, Manzo, Cummings & Mehler, Ltd.

(57) ABSTRACT

To provide means for forming projected and recessed portions for preventing mirror face reflection of a reflecting electrode without increasing steps, in a method of fabricating a reflection type liquid crystal display device, to achieve light scattering performance by providing recessed and projected portions at a surface of a pixel electrode, projected portions 701 and 702 are formed by the same photomask as that in forming TFT to thereby form projected and recessed portions at a surface of a pixel electrode 169.

35 Claims, 30 Drawing Sheets

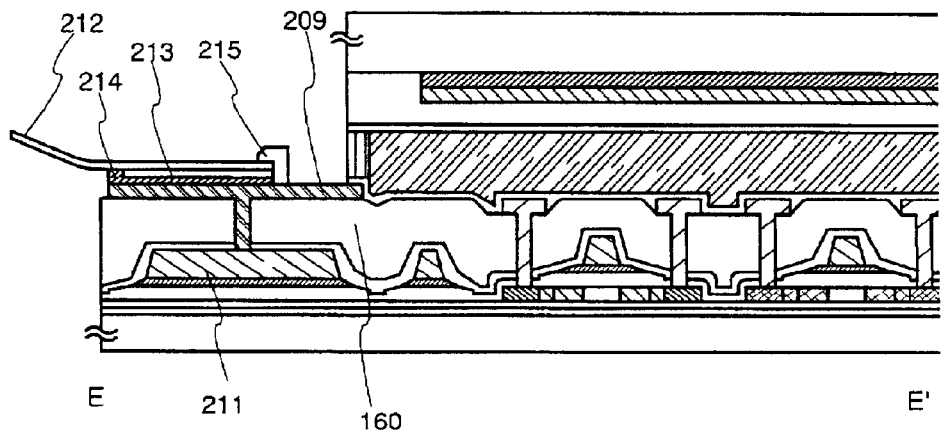
Fig. 8A cross sectional view of E-E'
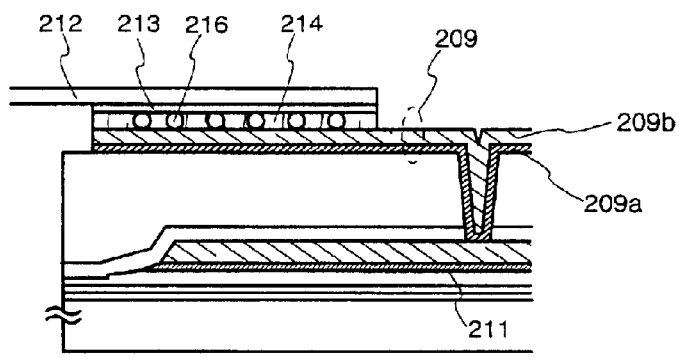
Fig. 8B

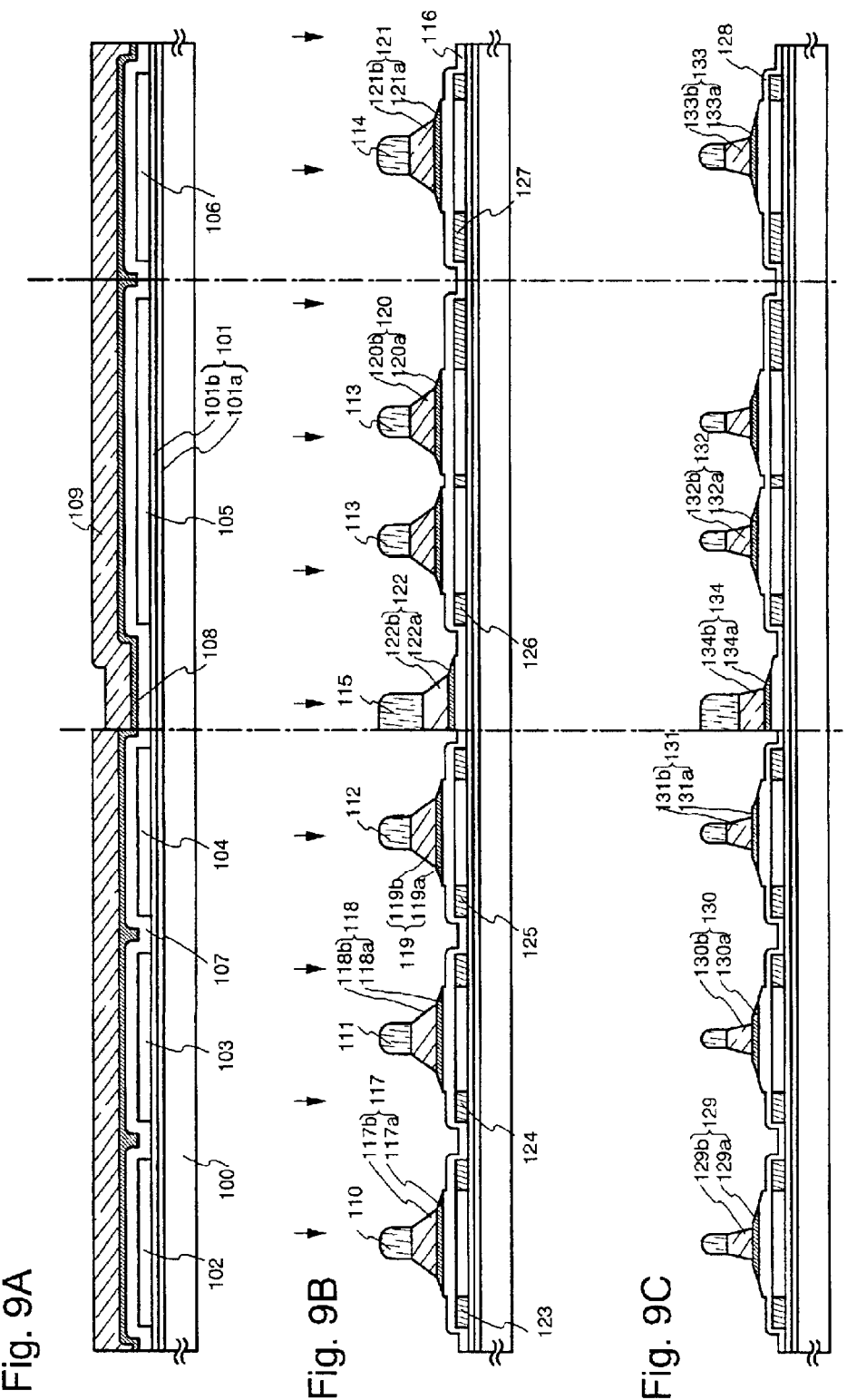

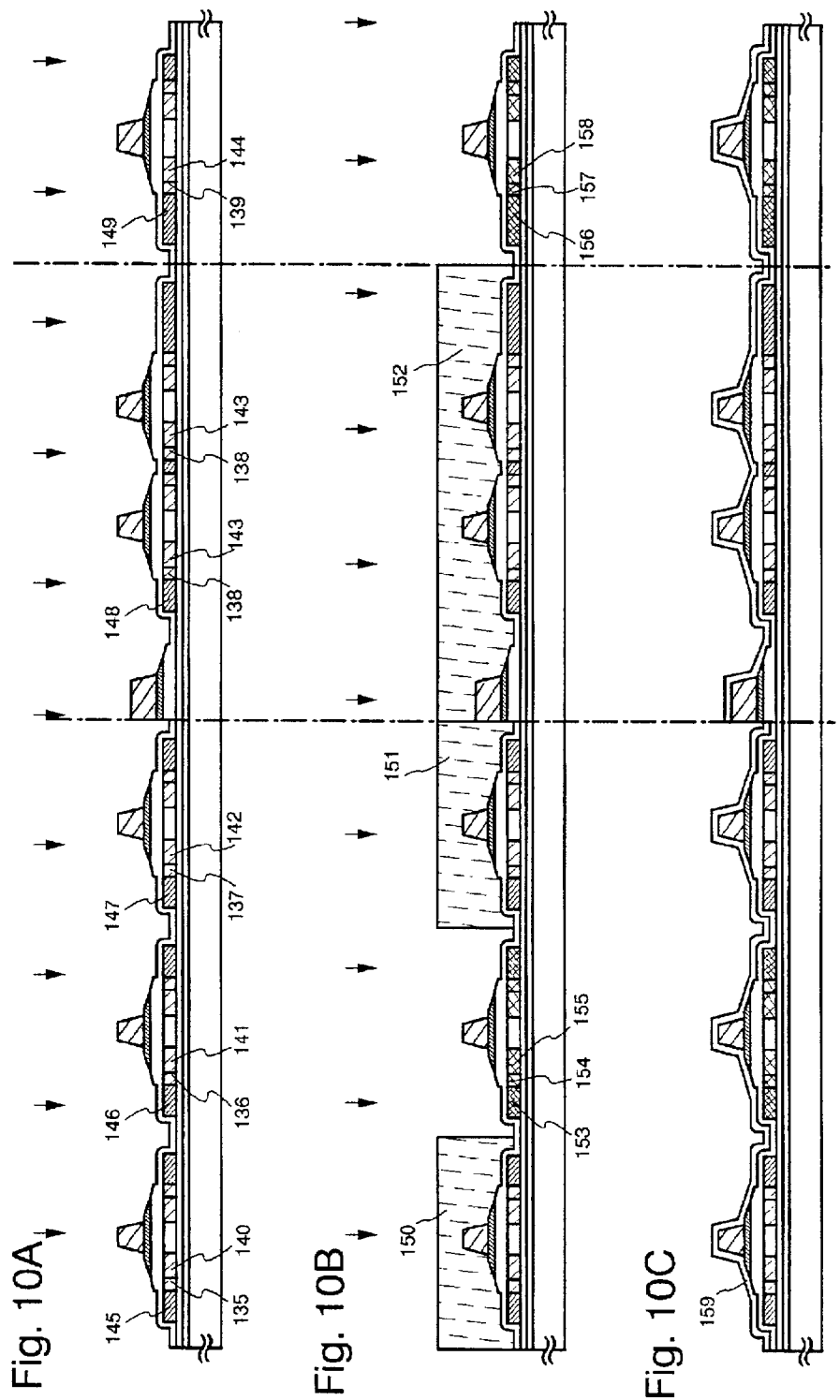

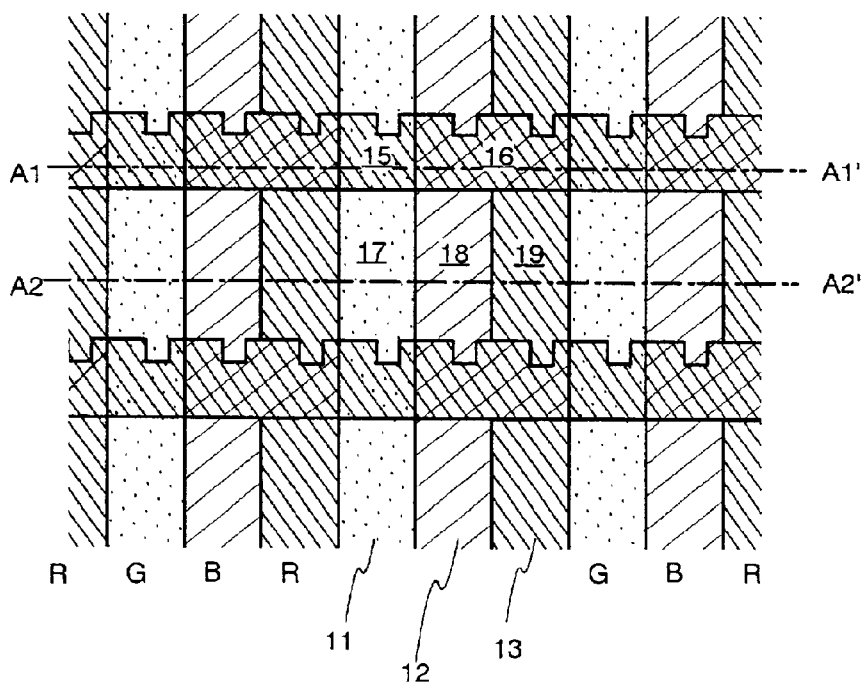
Fig. 13A
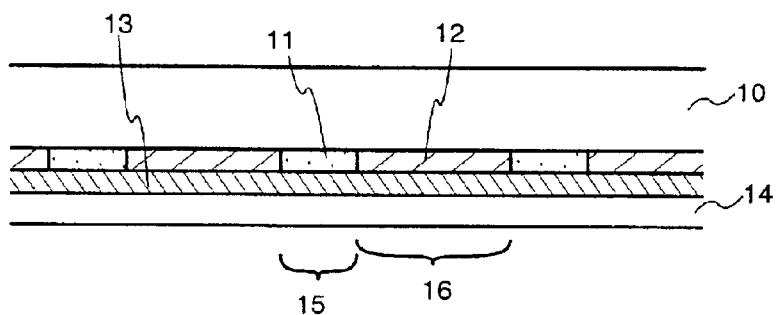
Fig. 13B  cross sectional view of A1-A1'
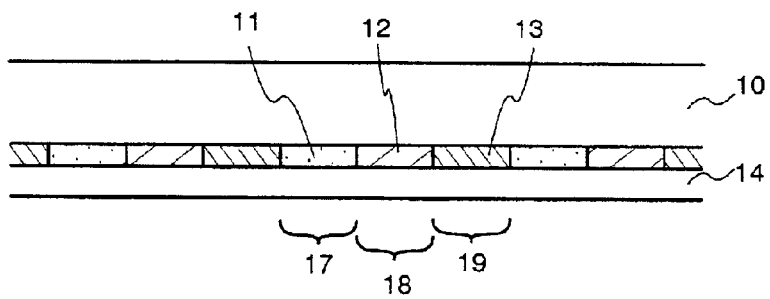
Fig. 13C  cross sectional veiw of A2-A2'

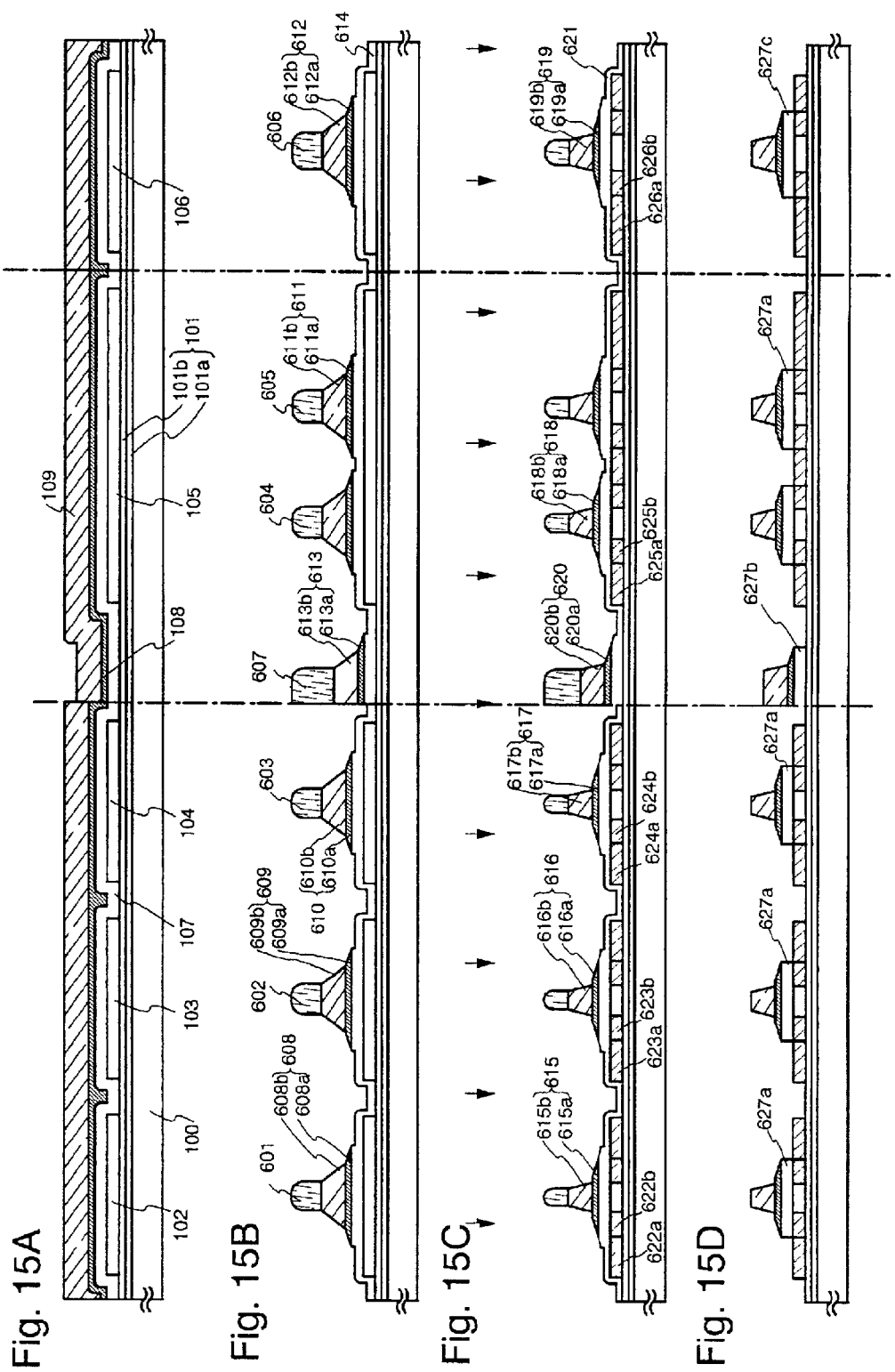

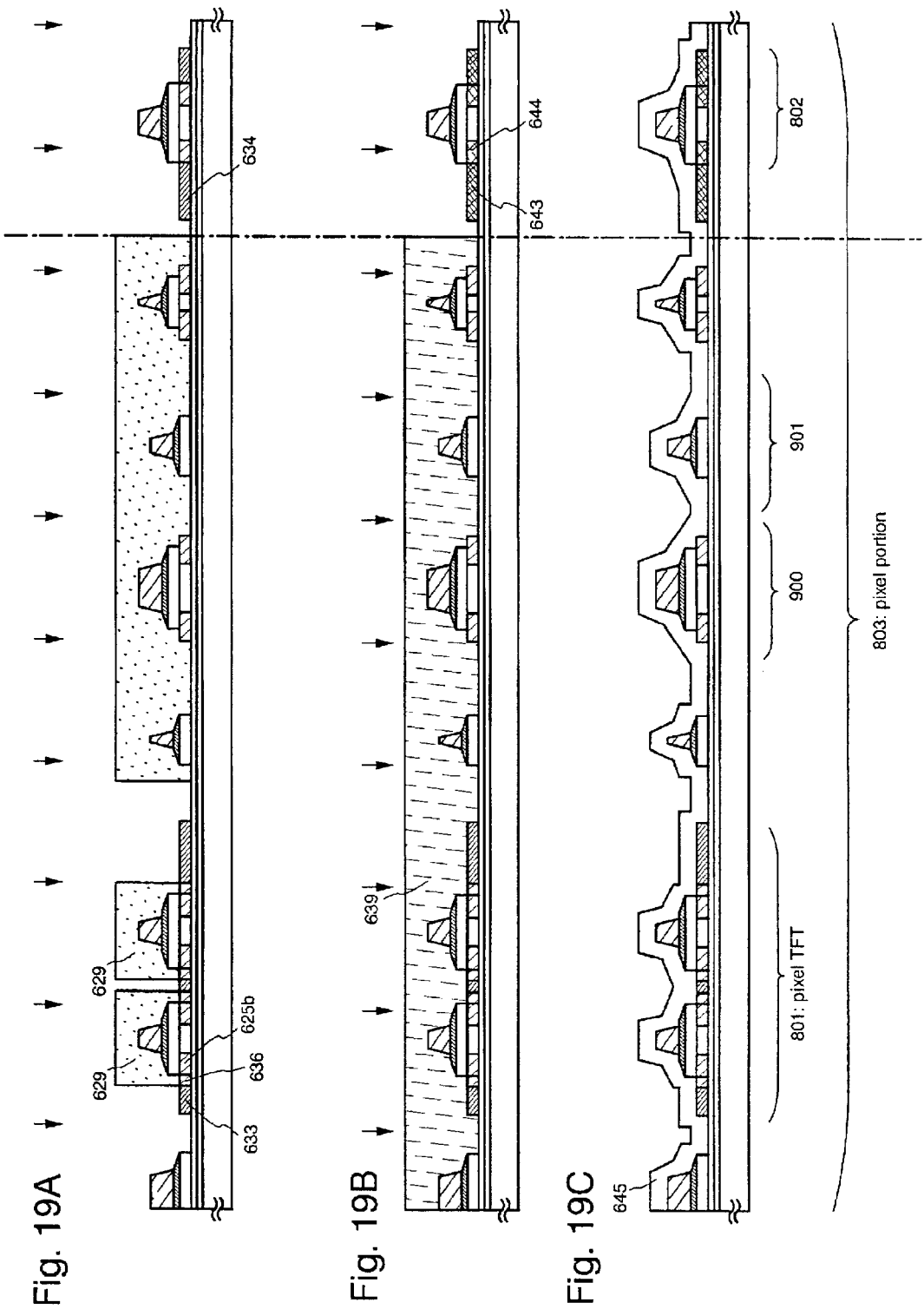

SEMICONDUCTOR DEVICE AND METHOD OF FABRICATING THEREOF

BACKGROUND OF THE INVENTION

1. Field of the Invention

The present invention relates to a semiconductor device having a circuit constituted by a thin film transistor (hereinafter, referred to as TFT) and a method of fabricating thereof. For example, the invention relates to an electro-optic device represented by a liquid crystal panel and an electronic device mounted with such an electro-optic device as a part.

Further, in the specification, a semiconductor device generally indicates a device capable of functioning by utilizing semiconductor properties and all of electro-optic devices, semiconductor circuits and electronic device are defined as semiconductor devices.

2. Description of the Related Art

In recent years, attention is attracted to a technology of constituting a thin film transistor (TFT) by using a semiconductor thin film (thickness: about several through several hundreds nm) formed above a substrate having an insulating surface. The thin film transistor is widely applied to an electronic device such as IC or an electro-optic device and development thereof is expedited particularly as a switching element of an image display device.

In a liquid crystal display device, attention is attracted to an active matrix type liquid crystal display device arranging pixel electrodes in matrix and using TFTs as switching elements connected to the respective pixel electrodes to provide high grade image.

According to the active matrix type liquid crystal display device, there are known two kinds of types of a transmission type and a reflection type by gross classification.

Particularly, according to the reflection type liquid crystal display device, in comparison with the transmission type liquid crystal display device, there is provided an advantage of small power consumption since a backlight is not used and there is increased demand therefore as a directly viewing type display for a mobile computer or a video camera.

Further, the reflection type liquid crystal display device displays brightness and darkness by selecting a state in which incident light is reflected by a pixel electrode and is outputted to outside of the device and a state in which incident light is not outputted to outside the device by utilizing an optical modulating operation of liquid crystal and displays an image by a combination of these. Generally, the pixel electrode in the reflection type liquid crystal display device comprises a metal material having high optical reflectance such as aluminum and is electrically connected to a switching element of a thin film transistor (hereinafter, referred to as TFT).

Further, according to a liquid crystal display device, a liquid crystal material is sandwiched between an element substrate arranged with TFTs constituting semiconductors by amorphous silicon or polysilicon in matrix and respectively formed with pixel electrodes connected to respective TFTs and source lines and gate lines, and an opposed substrate having opposed electrodes arranged to be opposed thereto. Further, a color filter for color display is pasted to the opposed substrate. Further, the element substrate and the opposed substrate are respectively arranged with polarizers as optical shutters for displaying color image.

According to the reflection type liquid crystal display device, conventionally, after forming the pixel electrode, a surface thereof is made to be recessed and projected by adding a step of a sand blast process or an etching process to thereby prevent mirror face reflection and a whiteness degree is increased by scattering reflected light.

According to the invention, there are formed projected and recessed portions for preventing mirror face reflection of a reflecting electrode.

SUMMARY OF THE INVENTION

According to the present invention, a method of fabricating a liquid crystal display device of a reflection type is characterized in that a projected portion is formed by using the same photomask as that in forming TFT to achieve light scattering performance by providing recessed and projected portions on a surface of a pixel electrode. Further, the projected portion is pertinently provided on a substrate at a pixel region other than wirings and a TFT portion. Further, projected and recessed portions are formed on a surface of a pixel electrode along projected and recessed portions formed at a surface of an insulating film covering the projected portion.

According to an aspect of the invention disclosed in the specification, there is provided a semiconductor device comprising TFT including a semiconductor layer on an insulating surface, an insulating film on the semiconductor layer and a gate electrode on the insulating film, a plurality of projected portions on the insulating surface, an interlayer insulating film covering the TFT and the projected portions and having a projected and recessed surface, and a pixel electrode electrically connected to the TFT and having a projected and recessed surface on the interlayer insulating film.

Further, it should be noted that an insulating film covering a gate electrode of a thin film transistor is formed, and a pixel electrode in contact with a projected portion not overlapped with the insulating film may be formed. Thus, according to another aspect of the invention, there is provided a semiconductor device comprising TFT including a semiconductor layer on an insulating surface, an insulating film on the semiconductor layer and a gate electrode on the insulating film, a plurality of projected portions on the insulating surface, and a pixel electrode brought into contact with the projected portions, having a projected and recessed surface and electrically connected to the TFT.

According to another aspect of the invention, there is provided the semiconductor device according to the above-described respective aspects wherein the projected portion is a laminated object of a material layer formed by the same material as that of the semiconductor layer of the TFT, a material layer formed by the same material as a material of the insulating film of the TFT and a material layer formed by the same material as that of the gate electrode of the TFT.

Further, according to another aspect of the invention, there is provided the semiconductor device according to the above-described respective aspects wherein the projected portion is a laminated object of a material layer formed by the same material as that of the insulating film of the TFT and a material layer formed by the same material as that of the gate electrode of the TFT.

Further, according to another aspect of the invention, there is provided the semiconductor device according to the above-described respective aspects wherein the projected portion is a material layer formed by the same material as that of the gate electrode of the TFT.

Further, according to another aspect of the invention, there is provided the semiconductor device according to the above-described respective aspects wherein the plurality of projected portions include projected portions having at least different heights.

Further, according to another aspect of the invention, there is provided the semiconductor device according to the above-described respective aspects wherein the plurality of projected portions include projected portions having at least different structures.

Further, according to another aspect of the invention, there is provided the semiconductor device according to the above-described respective aspects wherein the semiconductor device is a liquid crystal display device of a reflection type in which the pixel electrode comprises a film having a major component of Al or Ag or a laminated film of these.

Further, according to another aspect of the invention, there is provided the semiconductor device according to the above-described respective aspects, further comprising a first light shielding portion comprising laminated layers of a first color layer and a second color layer, and a second light shielding portion comprising laminated layers of the first color layer and a third color layer, wherein the first light shielding portion and the second light shielding portion are formed to overlap an interval between an arbitrary one of the pixel electrode and the pixel electrode contiguous to the arbitrary one of the pixel electrode.

Further, according to another aspect of the invention, there is provided the semiconductor device according to the above-described respective aspects wherein an amount of reflected light of the first light shielding portion and an amount of reflected light of the second light shielding portion are different from each other. Further, according to another aspect of the invention, there is provided the semiconductor device according to the above-described respective aspects wherein the first color layer is constituted by red color. Further, according to another aspect of the invention, there is provided the semiconductor device according to the above-described respective aspects wherein the second color layer is constituted by blue color. Further, according to another aspect of the invention, there is provided the semiconductor device according to the above-described respective aspects wherein the third color layer is constituted by green color. Further, according to another aspect of the invention, there is provided the semiconductor device according to the above-described respective aspects wherein the first light shielding portion and the second light shielding portion are provided at an opposed substrate.

Further, in order to realize the above-described structure, according to another aspect of the invention, there is provided a method of fabricating a semiconductor device comprising a step of forming a semiconductor layer on an insulating surface, a step of forming a first insulating film on the semiconductor layer, a step of forming a conductive layer overlapping the semiconductor layer on the first insulating film and forming a projected portion comprising a laminated structure of the semiconductor layer and the first insulating film and the conductive layer, a step of forming a second insulating film covering the projected portion, and a step of forming a pixel electrode on the second insulating film, wherein the pixel electrode overlaps the projected portion and includes projected and recessed portions on a surface thereof. It should be noted that the projected portion corresponds to numeral 900 in FIG. 20.

Further, in order to realize the above-described structure, according to another aspect of the invention, there is provided a method of fabricating a semiconductor device comprising a step of forming a first insulating film on an insulating surface, a step of forming a conductive layer on the first insulating film and forming a projected portion comprising a laminated structure of the first insulating film and the conductive layer, a step of forming a second insulating film covering the projected portion, and a step of forming a pixel electrode on the second insulating film, wherein the pixel electrode overlaps the projected portion and includes projected and recessed portions on a surface thereof. It should be noted that the projected portion corresponds to numeral 901 in FIG. 20, and the first insulating film constituting the projected portion has the same shape as the conductive layer when viewed from upper side.

Further, in order to realize the above-described structure, according to another aspect of the invention, there is provided a method of fabricating a semiconductor device comprising a step of forming a conductive layer on an insulating surface and forming a projected portion comprising the conductive layer, a step of forming an insulating film covering the projected portion, and a step of forming a pixel electrode on the insulating film, wherein the pixel electrode overlaps the projected portion and includes projected and recessed portions on a surface thereof.

Further, according to another aspect of the invention, there is provided the method of fabricating a semiconductor device according to the above-described aspects wherein the semiconductor device is a liquid crystal display device of a reflection type in which the pixel electrode comprises a film having a major component of Al or Ag or a laminated film of these.

Further, according to another aspect of the invention, there is provided the method of fabricating a semiconductor device according to the above-described aspects wherein TFT is formed by the same step as that of forming the projected portion.

Further, according to another aspect of the invention, there is provided the method of fabricating a semiconductor device according to the above-described aspects wherein the pixel electrode is connected to TFT formed by the same step as that of forming the projected portion.

BRIEF DESCRIPTION OF THE DRAWINGS

FIGS. 8A and 8B are views showing a terminal portion of AM-LCD;

FIGS. 9A, 9B and 9C are views showing steps of fabricating AM-LCD;

FIGS. 10A, 10B and 10C are views showings steps of fabricating AM-LCD;

FIGS. 13A, 13B and 13C are views showing a top view and sectional views of an arrangement of color layers;

FIGS. 15A, 15B, 15C and 15D are views showing steps of fabricating AM-LCD;

FIGS. 19A, 19B and 19C are views showing steps of fabricating AM-LCD (pixel portion);

DETAILED DESCRIPTION OF THE PREFERRED EMBODIMENTS

An explanation will be given of embodiments of the invention as follows.

Figure 4:
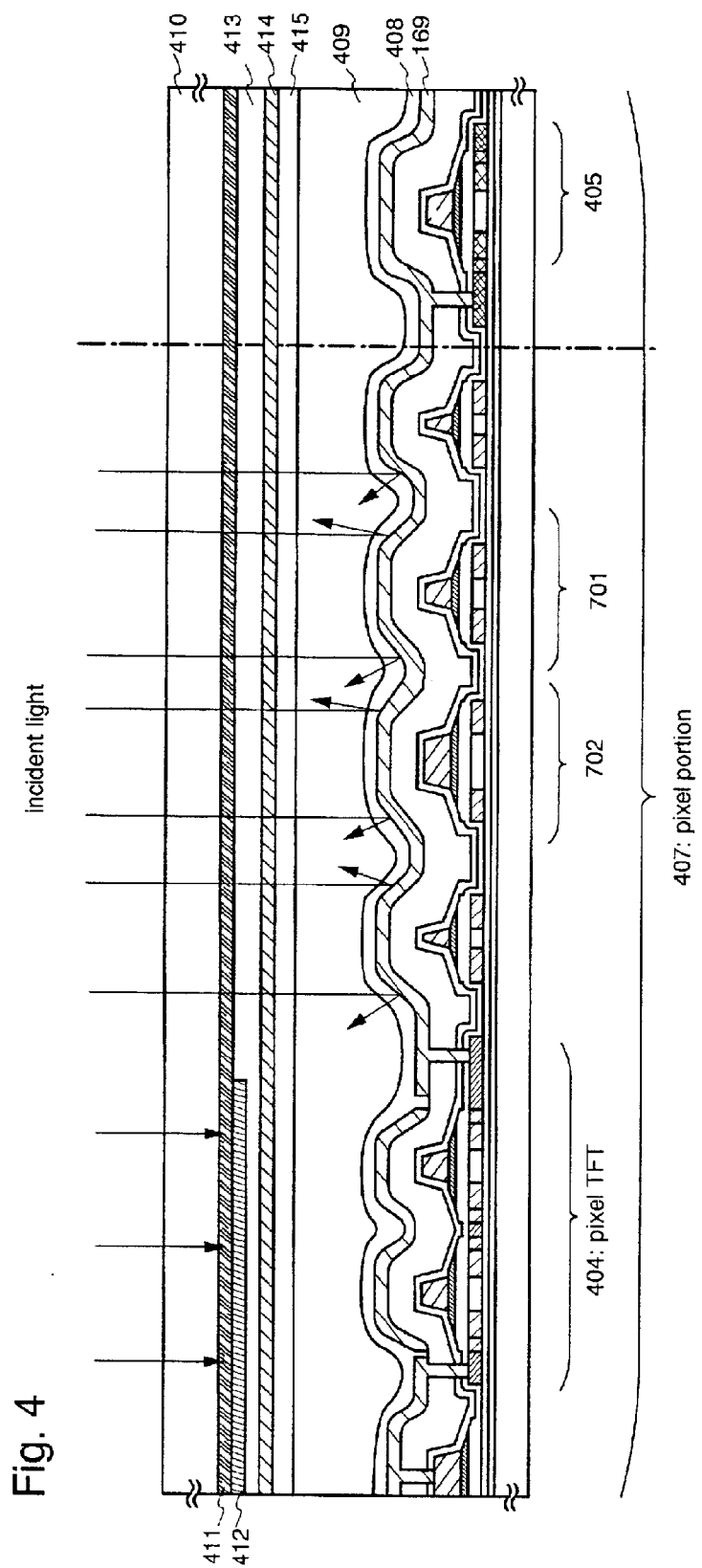
FIG. 4 is a view showing a sectional structure of an active matrix type liquid crystal display device.

FIG. 4 shows a constitution of the invention. Here, an explanation will be given as follows by taking an example of a liquid crystal display device of a reflection type.

The invention is characterized in that in a pixel portion 407, projected portions 701 and 702 are formed simultaneously with forming a pixel TFT, a surface of an insulating film formed thereabove is made to be recessed and projected and recessed and projected portions are provided to a surface of a pixel electrode 169 formed thereabove.

As shown in FIG. 1A through FIG. 3, the projected portions 701 and 702 are formed by using a mask pattern in forming a semiconductor layer or a mask pattern in forming a gate wiring. When the projected portions 701 and 702 are fabricated by using a photomask, there are provided the projected portions 701 and 702 having high reproducibility. Further, although in this case, as the projected portions 701 and 702, there is shown an example of laminating a semiconductor film, an insulating film and a conductive film which are formed in fabricating a pixel TFT, the invention is not particularly limited thereto but there can be used single layers of these films or a laminated layer combined therewith. For example, there can be formed a projected portion comprising a laminated film of a semiconductor film and an insulating film or a projected portion comprising a conductive film. That is, there can be formed projected portions having a plurality of kinds of heights without increasing the number of steps. Further, projected portions proximate to each other are respectively isolated from each other by 0.1 $\mu$m or more, preferably, 1 $\mu$m or more.

Further, although in this case, there is shown an example of forming projected portions having different sizes, the invention is not particularly limited thereto. Further, it is preferable that sizes of projected portions are at random for further scattering reflected light. For example, a section of a projected portion in a diameter direction may be formed in a polygonal shape or may be formed in a shape that is not symmetric in left and right direction. For example, the shape may be any of shapes shown by FIGS. 6A through 6G. Further, the projected portions may be arranged regularly or arranged irregularly. Further, arrangement of the projected portions is not particularly limited so far as the projected portion is disposed in a region on a lower side of the pixel electrode constituting a display region of the pixel portion and although a size (area viewed from upper face) of the projected portion is not particularly limited, the size may be in a range of 1 $\mu$m$^2$ through 400 $\mu$m$^2$, preferably, 25 through 100 $\mu$m$^2$.

The insulating film covering the projected portions 701 and 702 formed in this way, is formed with projected and recessed portions at a surface thereof and a surface of the pixel electrode 169 formed thereabove, is also made to be projected and recessed. A height of the projected portion of the pixel electrode 169, falls in a range of 0.3 through 3 $\mu$m, preferably, 0.5 through 1.5 $\mu$m. By the projected and recessed portions formed at the surface of the pixel electrode 169, as shown in FIG. 4, when incident light is reflected, the light can be scattered.

Further, as the insulating film, there can be used an inorganic insulating film or an organic resin film. It is also possible to adjust radii of curvature of the projected and recessed portions of the pixel electrode by a material of the insulating film. Further, a radius of curvature at the projected portion of the pixel electrode, falls in a range of 0.1 through 4 $\mu$m, preferably, 0.2 through 2 $\mu$m. Further, when an organic resin film is used as the insulating film, there is used an organic resin film having the viscosity of 10 through 1000 cp, preferably, 40 through 200 cp and there is used an organic resin film a surface of which is formed with projected and recessed portions by being sufficiently influenced by the projected portions 701 and 702. However, when there is used a solvent which is difficult to evaporate, the projected and recessed portions can be formed even with low viscosity of an organic resin film.

In this way, according to the invention, there can be formed the pixel electrode 169 having the projected and recessed portions at its surface without increasing the number of fabricating steps.

Further, although there is shown an example of a top gate type TFT, the invention is applicable to a bottom gate type TFT.

A further detailed explanation will be given of the invention constituted as described above by embodiments shown below.

[Embodiment 1]

Figure 1:
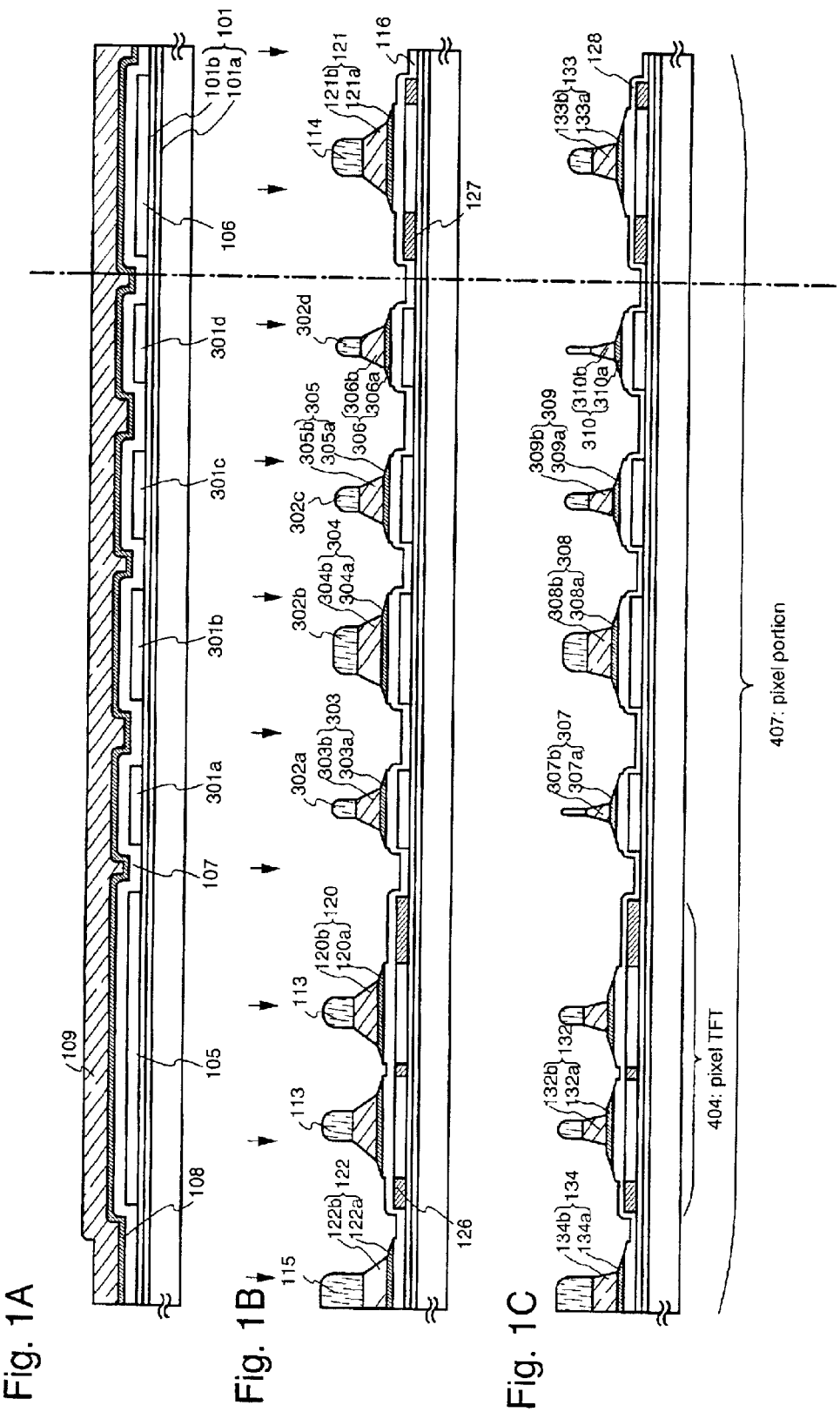
FIGS. 1A, 1B and 1C are views showing steps of fabricating AM-LCD (pixel portion)
Figure 2:
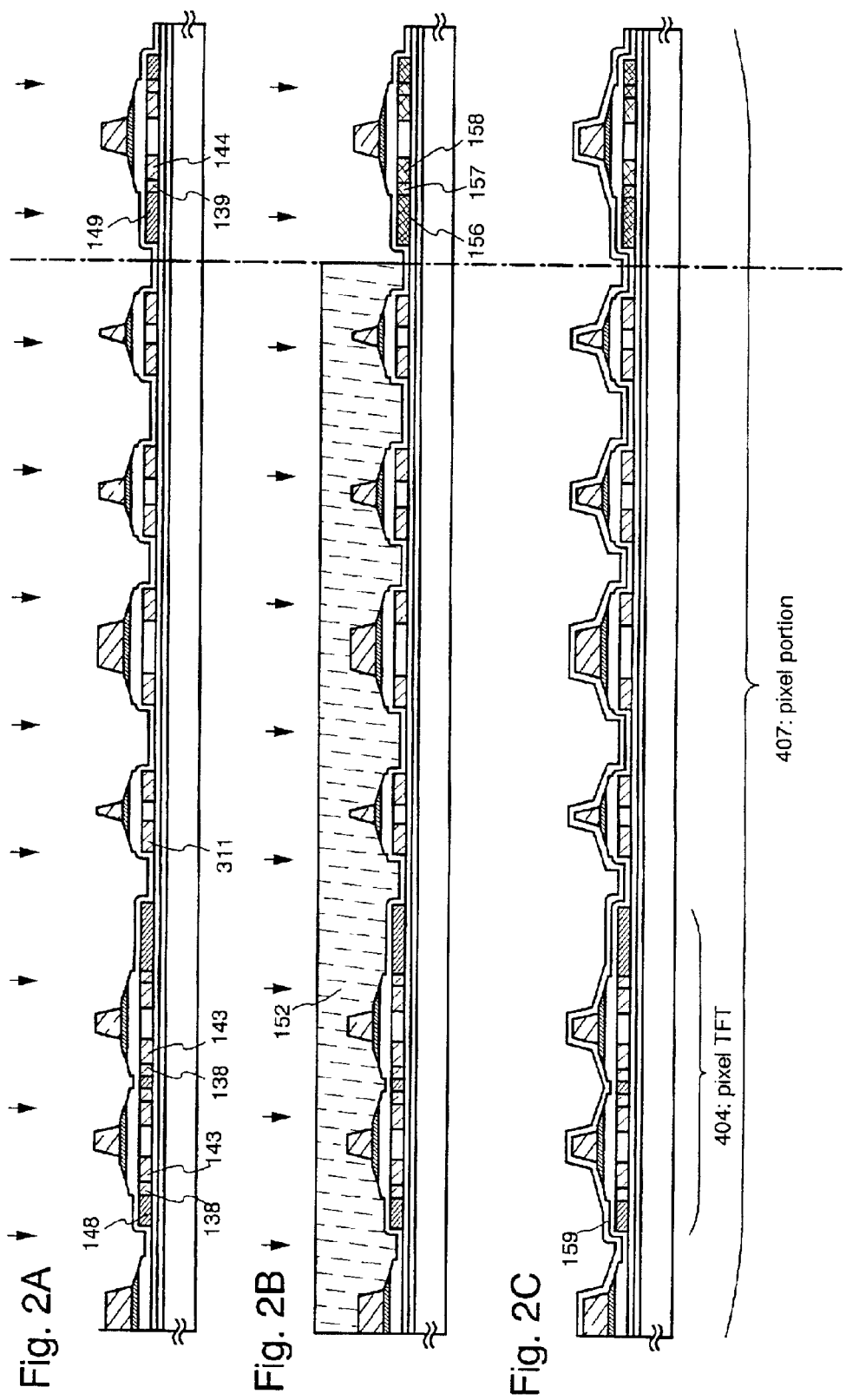
FIGS. 2A, 2B and 2C are views showing steps of fabricating AM-LCD (pixel portion)
Figure 3:
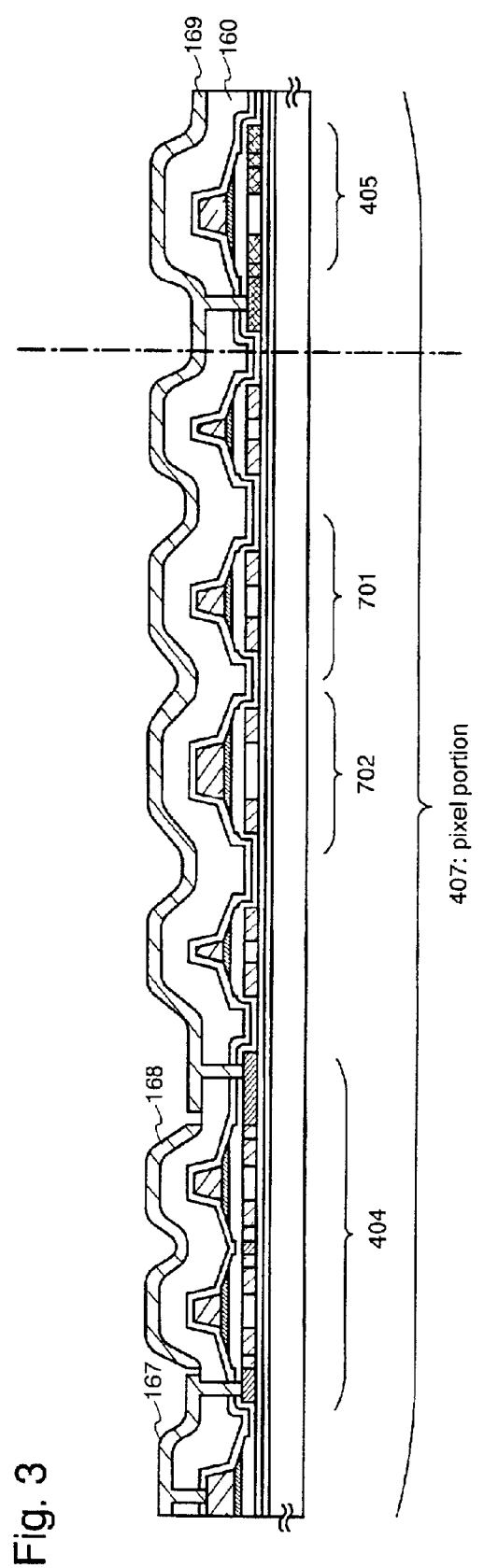
FIG. 3 is a view showing a step of fabricating AM-LCD (pixel portion)
Figure 11:
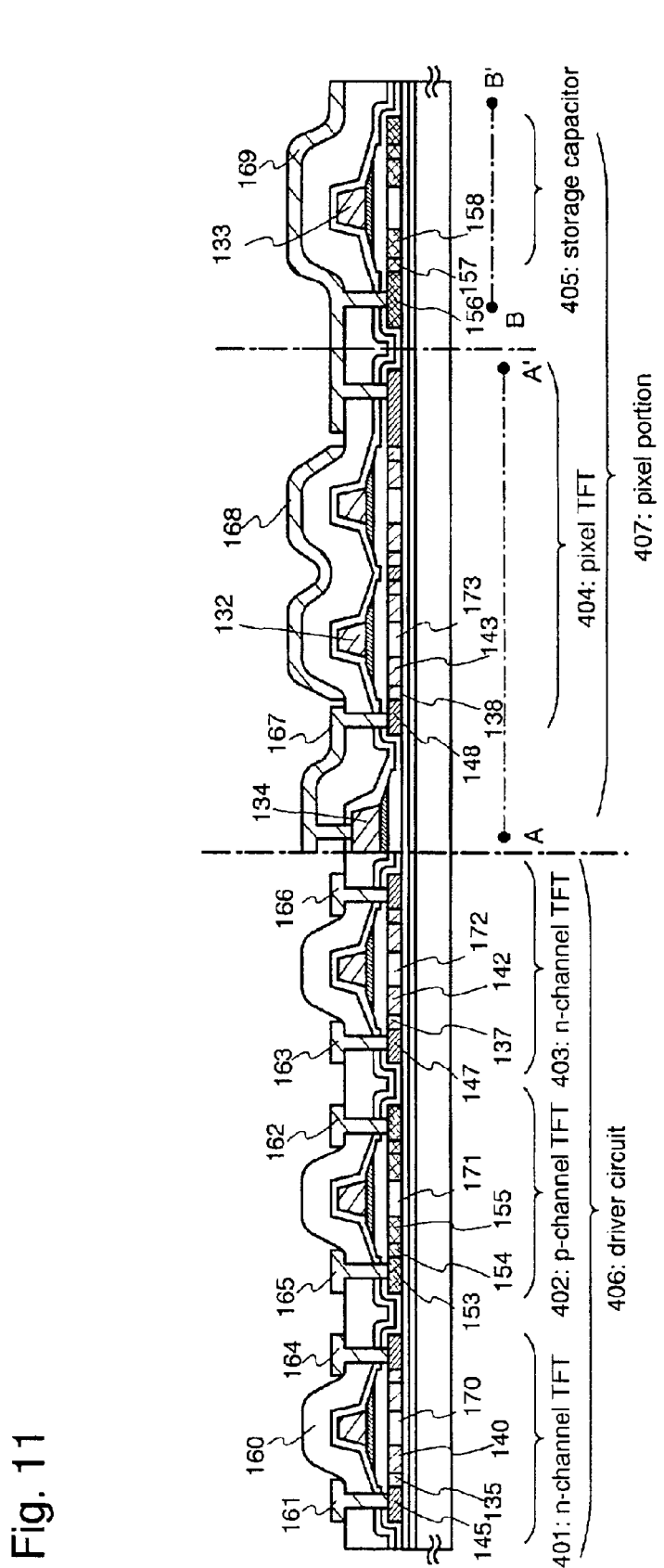
FIG. 11 is a view showing a step of fabricating AM-LCD.

Here, a method of simultaneously forming, on the same substrate, a pixel portion and TFTs (n-channel TFT and p-channel TFT) of a driver circuit formed in the periphery of the pixel portion, is described in detail. FIGS. 9 to 11 are used to chiefly explain and at the same time, the method of forming the reflection electrode having a projected portion and a recessed portion using FIGS. 1 to 3. FIGS. 1 to 3 are forming process figures of a pixel portion (a pixel TFT, a projected portion and a storage capacitor). FIGS. 9 to 11 are forming process figure of a pixel portion (pixel TFT and capacitor) and TFT of driving circuit.

First, in this embodiment, a substrate 100 is used, which is made from glass, such as barium borosilicate glass or aluminum borosilicate, represented by such as Corning #7059 glass and #1737. Note that, as the substrate 100, a quartz substrate, or a silicon substrate, a metal substrate, or a stainless substrate, on which an insulating film is formed, may be used as the replace. A plastic substrate having heat resistance to a process temperature of this embodiment may also be used.

Then, a base film 101 formed from an insulating film such as a silicon oxide film, a silicon nitride film or a silicon oxynitride film. In this embodiment, a two-layer structure is used as the base film 101. However, a single-layer film or a lamination structure consisting of two or more layers of the insulating film may be used. As a first layer of the base film 101, a silicon oxynitride film 102a is formed into a thickness of 10 to 200 nm (preferably 50 to 100 nm) using $SiH_4$, $NH_3$, and $N_2O$ as reaction gases by plasma CVD. In this embodiment, the silicon oxynitride film 101a (composition ratio Si=32%, O=27%, N=24% and H=17%) having a film thickness of 50 nm is formed. Then, as a second layer of the base film 101, a silicon oxynitride film 101b is formed so as to laminate thereon into a thickness of 50 to 200 nm (preferably 100 to 150 nm) using $SiH_4$ and $N_2O$ as reaction gases by plasma CVD. In this embodiment, the silicon oxynitride film 101b (composition ratio Si=32%, O=59%, N=7% and H=2%) having a film thickness of 100 nm is formed.

Subsequently, semiconductor layers 102 to 106 are formed on the base film. The semiconductor layers 102 to 106 are formed from a semiconductor film having an amorphous structure by a known method (a sputtering method, an LPCVD method, or a plasma CVD method), and is subjected to a known crystallization process (a laser crystallization method, a thermal crystallization method, or a thermal crystallization method using a catalyst such as nickel). The crystalline semiconductor film thus obtained is patterned into desired shapes to obtain the semiconductor layers. The semiconductor layers 102 to 106 are formed into the thickness of from 25 to 80 nm (preferably 30 to 60 nm). The material of the crystalline semiconductor film is not particularly limited, but it is preferable to form the film using silicon, a silicon germanium (SiGe) alloy, or the like. In this embodiment, 55 nm thick amorphous silicon film is formed by plasma CVD, and then, nickel-containing solution is held on the amorphous silicon film. A dehydrogenation process of the amorphous silicon film is performed (500° C. for one hour), and thereafter a thermal crystallization process is performed (550° C. for four hours) thereto. Further, to improve the crystallinity thereof, laser anneal treatment is performed to form the crystalline silicon film. Then, this crystalline silicon film is subjected to a patterning process using a photolithography method, to obtain the semiconductor layers 102 to 106.

Further, after the formation of the semiconductor layers 102 to 106, a minute amount of impurity element (boron or phosphorus) may be doped to control a threshold value of the TFT.

Besides, in the case where the crystalline semiconductor film is manufactured by the laser crystal method, a pulse oscillation type or continuous-wave type excimer laser, YAG laser, or $YVO_4$ laser may be used. In the case where those lasers are used, it is appropriate to use a method in which laser light radiated from a laser oscillator is condensed by an optical system into a linear beam, and is irradiated to the amorphous semiconductor film. Although the conditions of the crystallization should be properly selected by an operator, in the case where the excimer laser is used, a pulse oscillation frequency is set as 30 Hz, and a laser energy density is as 100 to 400 mJ/cm$^2$ (typically 200 to 300 mJ/cm$^2$). In the case where the YAG laser is used, it is appropriate that the second harmonic is used to set a pulse oscillation frequency as 1 to 10 kHz, and a laser energy density is set as 300 to 600 mJ/cm$^2$ (typically, 350 to 500 mJ/cm$^2$). Then, laser light condensed into a linear shape with a width of 100 to 1000 $\mu$m, for example, 400 $\mu$m is irradiated to the whole surface of the substrate, and an overlapping ratio (overlap ratio) of the linear laser light at this time may be set as 80 to 98%.

A gate insulating film 107 is then formed for covering the semiconductor layers 102 to 106. The gate insulating film 107 is formed from an insulating film containing silicon by plasma CVD or sputtering into a film thickness of from 40 to 150 nm. In the embodiment, the gate insulating film 107 is formed from a silicon oxynitride film into a thickness of 110 nm by plasma CVD (composition ratio Si=32%, O=59%, N=7%, and H=2%). Of course, the gate insulating film is not limited to the silicon oxynitride film, an insulating film containing other silicon may be formed into a single layer of a lamination structure.

Beside, when the silicon oxide film is used, it can be formed by plasma CVD in which TEOS (tetraethyl orthosilicate) and $O_2$ are mixed, with a reaction pressure of 40 Pa, a substrate temperature of from 300 to 400° C., and discharged at a high frequency (13.56 MHz) power density of 0.5 to 0.8 W/cm$^2$. Good characteristics as the gate insulating film can be obtained in the silicon oxide film thus manufactured by subsequent thermal annealing at 400 to 500° C.

Then, as shown in FIG. 9A, on the gate insulating film 107, a first conductive film 108 and a second conductive film 109 are formed into lamination to have a film thickness of 20 to 100 nm and 100 to 400 nm, respectively. In this embodiment, the first conductive film 108 made from a TaN film with a film thickness of 30 nm and the second conductive film 109 made from a W film with a film thickness of 370 nm are formed into lamination. The TaN film is formed by sputtering with a Ta target under an atmosphere containing nitrogen. Besides, the W film is formed by the sputtering method with a W target. The W film may be formed by thermal CVD using tungsten hexafluoride ($WF_6$). Whichever method is used, it is necessary to make the material have low resistance for use as the gate electrode, and it is preferred that the resistivity of the W film is set to less than or equal to 20 $\mu\Omega$cm. By making the crystal grains large, it is possible to make the W film have lower resistivity. However, in the case where many impurity elements such as oxygen are contained within the W film, crystallization is inhibited and the resistance becomes higher. Therefore, in this embodiment, by forming the W film having high purity by sputtering using a target having a purity of 99.9999% or 99.99%, and in addition, by taking sufficient consideration to prevent impurities within the gas phase from mixing therein during the film formation, a resistivity of from 9 to 20 $\mu\Omega$cm can be realized.

Note that, in this embodiment, the first conductive film 108 is made of TaN, and the second conductive film 109 is made of W, but the material is not particularly limited thereto, and either film may be formed of an element selected from Ta, W, Ti, Mo, Al, and Cu, or an alloy material or a compound material containing the above element as its main ingredient. Besides, a semiconductor film typified by a polycrystalline silicon film doped with an impurity element such as phosphorus may be used. Besides, any combination may be employed such as a combination in which the first conductive film is formed of tantalum (Ta) and the second conductive film is formed of W, a combination in which the first conductive film is formed of tantalum nitride (TaN) and the second conductive film is formed of Al, or a combination in which the first conductive film is formed of tantalum nitride (TaN) and the second conductive film is formed of Cu.

FIG. 9A and FIG. 1A correspond to each other that the same marks are used to show them. As shown in FIG. 1A, the semiconductor layers 301a to 301d are formed in the pixel portion 407 simultaneously with semiconductor layer 105.

Next, masks 110 to 115 consisting of resist are formed by using a photolithography method, and a first etching process for forming electrodes and wirings is carried out. In the first etching process, the first and the second etching conditions are used. Note that chlorine gas typified by $Cl_2$, $BCl_3$, $SiCl_4$, $CCl_4$, or the like, fluorine gas typified by $CF_4$, $SF_6$, $NF_3$, or the like, or $O_2$ may optionally be used as etching gases. In this embodiment, an ICP (Inductively Coupled Plasma) etching method is used, in which $CF_4$, $Cl_2$, and $O_2$ are used as the etching gases, a gas flowing rate of each gas is set as 25/25/10 (sccm), and an RF (13.56 MHz) power of 500 W is applied to a coil type electrode under a pressure of 1 Pa to generate plasma. Thus the etching is performed. An RF (13.56 MHz) power of 150 W is also applied to the side of the substrate (sample stage) and a substantially negative self bias voltage is applied thereto. Based on this first etching condition, the W film is etched to make an end portion of the first conductive layer into a tapered shape.

Thereafter, the etching condition is changed into a second etching condition, and the etching is performed, without removing masks 110 to 115 consisting of resist, in which $CF_4$ and $Cl_2$ are used as the etching gases, a gas flowing rate of each gas is set as 30/30 (sccm), and an RF (13.56 MHz) power of 500 W is applied to a coil type electrode under a pressure of 1 Pa to generate plasma. Thus, the etching is performed about 30 seconds. An RF (13.56 MHz) power of 20 W is also applied to the side of the substrate (sample stage) and a substantially negative self bias voltage is applied thereto. In the second etching condition, in which $CF_4$ and $Cl_2$ are mixed, the W film and the TaN film are etched in the same degree. Note that, in order to perform the etching without leaving a residue on the gate insulating film, it is appropriated that an etching time is increased at a rate on the order of 10 to 20%.

Under the above first etching condition, by making the shapes of the masks consisting of resist suitable, end portions of the first conductive layer and the second conductive layer become the tapered shape by the effect of the bias voltage applied to the substrate side. The angle of the taper portion becomes 15 to 45. In this way, first shape conductive layers 117 to 122 consisting of the first conductive layers and the second conductive layers (the first conductive layers 117a to 122a and the second conductive layers 117b to 122b) are formed by the first etching process. Reference numeral 116 denotes a gate insulating film, and regions which are not covered with the first shape conductive layers 117 to 122 are etched by about 20 to 50 nm so that thinned regions are formed.

Then, a first doping process is performed without removing the masks consisting of resist, and an impurity element that imparts an n-type is added to the semiconductor layer. (FIG. 9B) Doping may be performed by ion doping or ion implanting. The condition of the ion doping method is such that a dosage is $1\times10^{13}$ to $5\times10^{15}$ atoms/cm, and an acceleration voltage is 60 to 100 keV. In this embodiment, the dosage is set as $1.5\times10^{15}$ atoms/cm$^2$, and the acceleration voltage is set as 80 keV. As the impurity element imparting the n-type, an element belonging to group 15, typically phosphorus (P) or arsenic (As) may be used, but phosphorus (P) is used here. In this case, the conductive layers 117 to 121 become masks to the impurity element imparting the n-type, and first impurity regions 123 to 127 are formed in a self-aligning manner. The impurity element imparting the n-type in the concentration range of $1\times10^{20}$ to $1\times10^{21}$ atoms/cm$^3$ is added to the first impurity regions 123 to 127.

FIG. 9B and FIG. 1B correspond to each other so that the same marks is used to show them. As shown in FIG. 1B, the first shape conductive layers 303 to 306 are formed using the masks consisting of resist 302a to 302d simultaneously with the first shape conductive layer 120.

Next, as shown in FIG. 9C, a second etching process is performed without removing the masks consisting of resist. In the second etching process, a third and a fourth etching conditions are used. The ICP etching method is similarly used by using the third etching condition, in which $CF_4$ and $Cl_2$ are used as the etching gases, a gas flowing rate of each gas is set as 30/30 (sccm), and an RF power (13.56 MHz) of 500 W is applied to a coil type electrode under a pressure of 1 Pa to generate plasma. Thus, the etching is performed about 60 seconds. An RF (13.56 MHz) power of 20 W is applied to the side of the substrate (sample stage) and a low self bias voltage as compared with the first etching process is applied thereto. In the third etching condition, in which $CF_4$, and $Cl_2$ are mixed, the W film and the TaN film are etched in the same degree.

Thereafter, the etching condition is changed into a fourth etching condition, and the etching is performed, without removing masks consisting of resist, in which $CF_4$, $Cl_2$, and $O_2$ are used as the etching gases, a gas flowing rate of each gas is set as 25/25/10 (sccm), and an RF (13.56 MHz) power of 500 W is applied to a coil type electrode under a pressure of 1 Pa to generate plasma. Thus, the etching is performed about 20 seconds. An RF (13.56 MHz) power of 20 W is also applied to the side of the substrate (sample stage) and a low self bias voltage as compared with the first etching process is applied thereto. In accordance with the fourth etching condition, the W film is etched.

Thus, in accordance with the third and fourth etching conditions, the W film is anisotropically etched, and the TaN film is anisotropically etched at an etching rate lower than the W film to form second shape conductive layers 129 to 134 (first conductive layers 129a to 134a and second conductive layers 129b to 134b). Reference numeral 128 designates a gate insulating film, and regions which are not covered with the second shape conductive layers 129 to 134 are etched into a film thickness of about 10 to 20 nm, which is thin.

An etching reaction to the W film or the TaN film by the mixture gas of $CF_4$ and $Cl_2$ can be guessed from a generated radical or ion species and the vapor pressure of a reaction product. When the vapor pressures of fluoride and chloride of W and TaN are compared with each other, $WF_6$ of fluoride of W is extremely high, and other $WCl_5$, $TaF_5$, and $TaCl_5$ have almost equal vapor pressures. Thus, in the mixture gas of $CF_4$ and $Cl_2$, both W and TaN films are etched. However, when a suitable amount of $O_2$ is added to this mixture gas, $CF_4$ and $O_2$ react with each other to form CO and F, and a large number of F radicals or F ions are generated. As a result, an etching rate of the W film having the high vapor pressure of fluoride is increased. On the other hand, with respect to TaN, even if F is increased, an increase of the etching rate is relatively small. Besides, since TaN is easily oxidized as compared with W, the surface of TaN is oxidized a little by an addition of $O_2$. Since the oxide of TaN does not react with fluorine or chlorine, the etching rate of the TaN film is further decreased. Accordingly, it becomes possible to make a difference between the etching rates of the W film and the TaN film, with the result that it becomes possible to make the etching rate of the W film higher than that of the TaN film.

FIG. 9C and FIG. 1C correspond to each other so that the same marks are used to show them. As shown in FIG. 1C, the second shape conductive layers 307 to 310 are formed in the pixel portion 407 simultaneously with the second shape conductive layer 132.

Subsequently, as shown in FIG. 10A, a second doping process is performed without removing the masks consisting of resist. In this case, a dosage is made lower than that of the first doping process, and an impurity element imparting the n-type is doped under the condition of a higher acceleration voltage. For example, an acceleration voltage is set to 70 to 120 keV, and the process is carried out at a dosage of $3.5 \times 10^{12}$ atoms/cm$^2$, so that new impurity regions are formed on the semiconductor layer inside the first impurity regions formed in FIG. 9B. The doping is performed in such a manner that the second shape conductive layers 129b to 133b are used as the masks to the impurity element, and the impurity element is added also to the semiconductor layer under the tapered shape portion of the second conductive layers 129a to 133a.

Note that the masks consisting of resist may be removed before performing the second doping process.

In this way, third impurity regions 140 to 144 overlapping with the second conductive layers 129a to 133a, and second impurity regions 135 to 139 between first impurity regions 145 to 149 and the third impurity regions are formed. The impurity element imparting the n-type is made to have a concentration of $1 \times 10^{17}$ to $1 \times 10^{19}$ atoms/cm$^3$ in the second impurity regions, and a concentration of $1 \times 10^{16}$ to $1 \times 10^{18}$ atoms/cm in the third impurity regions. Note that, the third impurity regions 140 to 144 have a change in the concentration of the impurity element imparting the n-type at least contained in an overlapping portion with the second shape conductive layers 129a to 133a. In other words, the concentration of phosphorus (P) to be added to the third impurity regions 140 to 144 becomes gradually lower at the portion overlapping with the second shape conductive layers, as it advances from the edge portion of the conductive layer thereof toward the inside. This is because the concentrations of phosphorus (P) that reach to the semiconductor layer are changed due to the difference in the film thickness of the tapered portion.

FIG. 10A and FIG. 2A correspond to each other so that the same marks are used to show them. As shown in FIG. 2A, the third impurity region 311 is formed in the pixel portion 407.

Then, newly masks 150 to 152 consisting of resist are formed, and a third doping process is performed as shown in FIG. 10B. With this third doping process, fourth impurity regions 153 to 158 in which an impurity element imparting a conductivity opposite to the one conductivity type, are formed in the semiconductor layer that becomes an active layer of p-channel TFT. The second shape conductive layers 130 and 133 are used as the masks with respect to the impurity elements, and an impurity imparting a p-type is added to form the fourth impurity regions in a self-aligning manner. In this embodiment, the impurity regions 153 to 158 are formed by ion doping using diborane ($B_2H_6$). At the time of performing the third doping process, the semiconductor layer forming the n-channel TFT is covered with masks 150 to 152 consisting of resist. With the first and the second doping processes, the impurity regions 153 to 158 are doped with phosphorus in different concentrations, respectively. However, doping is performed so that the concentration of the impurity imparting p-channel in any of the regions falls within the range of $2 \times 10^{20}$ to $2 \times 10^{21}$ atoms/cm$^3$, with the result that the regions function as source and drain regions of the p-channel TFT, which causes no problem.

FIG. 10B and FIG. 2B correspond to each other so that the same remarks are used to show them. As shown in FIG. 2B, in the pixel portion 407, the semiconductor layers 301a to 301d are covered with mask 152 consisting of resist. Though not limited to this structure, the semiconductor layer of the pixel TFT (n-channel TFT) at the least.

By the steps up to this, the impurity regions are formed in the respective semiconductor layers. The second shape conductive layers 129 to 132 overlapping with the semiconductor layers function as gate electrodes. Besides, the layer 134 functions as a source wiring, and the layer 133 functions as a second electrode for forming a storage capacitor.

Subsequently, the masks 150 to 152 consisting of resist are removed, and a first interlayer insulating film 159 covering the whole surface is formed. This first interlayer insulating film 159 is formed from an insulating film containing silicon by plasma CVD or sputtering into a thickness of 100 to 200 nm. In this embodiment, a silicon oxynitride film with a film thickness of 150 nm is formed by plasma CVD. Of course, the first interlayer insulating film 159 is not particularly limited to the silicon oxynitride film, but an insulating film containing other silicon may be formed into a single layer or a lamination structure.

Then, as shown in FIG. 10C, a step of activating the impurity elements added in the respective semiconductor layers. This step is carried out by thermal annealing using a furnace annealing oven. The thermal annealing may be performed in a nitrogen atmosphere having an oxygen content of 1 ppm or less, preferably 0.1 ppm or less and at 400 to 700° C., typically 500 to 550° C. In this embodiment, a heat treatment at 550° C. for 4 hours is carried out. Note that, other than the thermal annealing method, a laser annealing method, or a rapid thermal annealing method (RTA method) can be applied thereto.

Note that, in this embodiment, at the same time with the above activation process, nickel used as the catalyst for crystallization is gettered to the impurity regions 145 to 149, 153 and 156 containing phosphorus at high concentration. As a result, nickel concentration of the semiconductor layer which becomes a channel forming region is mainly lowered. The TFT having a channel forming region thus formed is decreased in off current, and has high electric field mobility because of good crystallinity, thereby attaining satisfactory characteristics.

Further, an activation process may be performed before forming the first interlayer insulating film 159. However, in the case where a wiring material used for the layers 129 to 134 are weak to heat, it is preferable that the activation process is performed after an interlayer insulating film (containing silicon as its main ingredient, for example, silicon oxynitride film) is formed to protect the wiring or the like as in the present embodiment.

In addition, heat treatment at 300 to 550° C. for 1 to 12 hours is performed in an atmosphere containing hydrogen of 3 to 100% to perform a step of hydrogenating the semiconductor layers. In this embodiment, the heat treatment is performed at 410° C. for 1 hour in an atmosphere containing hydrogen of 3%. This step is a step of terminating dangling bonds in the semiconductor layer by hydrogen contained in the interlayer insulating film. As another means for hydrogenation, plasma hydrogenation (using hydrogen excited by plasma) may be carried out.

Besides, heat treatment (at 300 to 550° C. for 1 to 12 hours) may be performed using hydrogen contained in the interlayer insulating film formed from a silicon nitride film to perform the hydrogenation of the semiconductor layer. In this case, if the heat treatment is performed at 410° C. for 1 hour in a nitrogen atmosphere, the dangling bond in the semiconductor layer may be terminated due to hydrogen contained in the interlayer insulating film.

Besides, in the case of using a laser annealing method as the activation process, it is preferred to irradiate laser light such as an excimer laser or a YAG laser after the hydrogenating process.

Next, a second interlayer insulating film 160 made of an organic insulating material is formed on the first interlayer insulating film 159. In this embodiment, an acrylic resin film having a film thickness of 1.6 $\mu$m is formed. Then, patterning is performed for forming a contact hole reaching the source wiring 134 and the contact holes reaching the respective impurity regions 145, 147, 148, 153, and 156.

Then, in a driver circuit 406, wirings 161 to 166 electrically connecting to the first impurity region or the fourth impurity region, respectively, are formed. Note that these wirings are formed by patterning a lamination film of a Ti film with a film thickness of 50 nm and an alloy film (alloy film of Al and Ti) with a film thickness of 500 nm.

In a pixel portion 407, a pixel electrode 169, a gate wiring 168, and a connection electrode 167 are formed. (FIG. 11) By this connection electrode 167, the source wiring 134 is electrically connected to a pixel TFT 404. Also, the gate wiring 168 is electrically connected to the first electrode (second shape conductive layer 133). Besides, the pixel electrode 169 is electrically connected to the drain region of the pixel TFT, and further connected to the semiconductor layer which functions as one of electrodes forming a storage capacitor. Further, as the pixel electrode 169, a film containing Al or Ag as the main component, or a lamination film thereof is preferably used, which has excellent reflection property.

FIG. 11 and FIG. 3 correspond to each other so that the same marks are used to show them. As shown in FIG. 3, the recessed and projected pixel electrode 169 can be formed by in the pixel portion 407 by projected portions 701 and 702. The radius of curvature of the projected portion which is formed on the surface of pixel electrode 169 is formed into the thickness from 0.1 to 4 $\mu$m, preferably 0.2 to 2 $\mu$m.

In the manner as described above, a n-channel TFT 401, a p-channel TFT 402, the driving circuit 406 including an n-channel TFT 403, and the pixel TFT 404, the pixel portion 407 including a storage capacitor 405 can be formed on the same substrate. In the present specification, such a substrate is called an active matrix substrate for convenience.

The n-channel TFT 401 of the driving circuit 406 includes a channel forming region 170, the third impurity region 140 (GOLD region) overlapping with the second shape conductive layer 129 forming the gate electrode, the second impurity region 135 (LDD region) formed outside the gate electrode, and the first impurity region 145 functioning as a source region or a drain region. The p-channel TFT 402 includes a channel forming region 171, a fourth impurity region 155 overlapping with the second shape conductive layer 130 forming the gate electrode, a fourth impurity region 154 formed outside the gate electrode, and the fourth impurity region 153 functioning as a source region or a drain region. The n-channel TFT 403 includes a channel forming region 172, the third impurity region 142 (GOLD region) overlapping with the second shape conductive layer 131 forming the gate electrode, a second impurity region 137 (LDD region) formed outside the gate electrode, and the first impurity region 147 functioning as a source region or a drain region.

The pixel TFT 404 of the pixel portion includes a channel forming region 173, the third impurity region 143 (GOLD region) overlapping with the second shape conductive layer 132 forming the gate electrode, a second impurity region 138 (LDD region) formed outside the gate electrode, and the first impurity region 148 functioning as a source region or a drain region. Besides, impurity elements imparting p-type are added to the respective semiconductor layers 156 to 158 functioning as one of electrodes of the storage capacitor 405 at the same concentration with the fourth impurity region. The storage capacitor 405 is formed from the second electrode 133 and the semiconductor layers 156 to 158 using the insulating film (the same film with the gate insulating film) as a dielectric member.

Further, in the pixel structure of the present embodiment, an end portion of the pixel electrode is formed by arranging it so as to overlap with the source wiring so that the gap between the pixel electrodes is shielded from light without using a black matrix.

Figure 5:
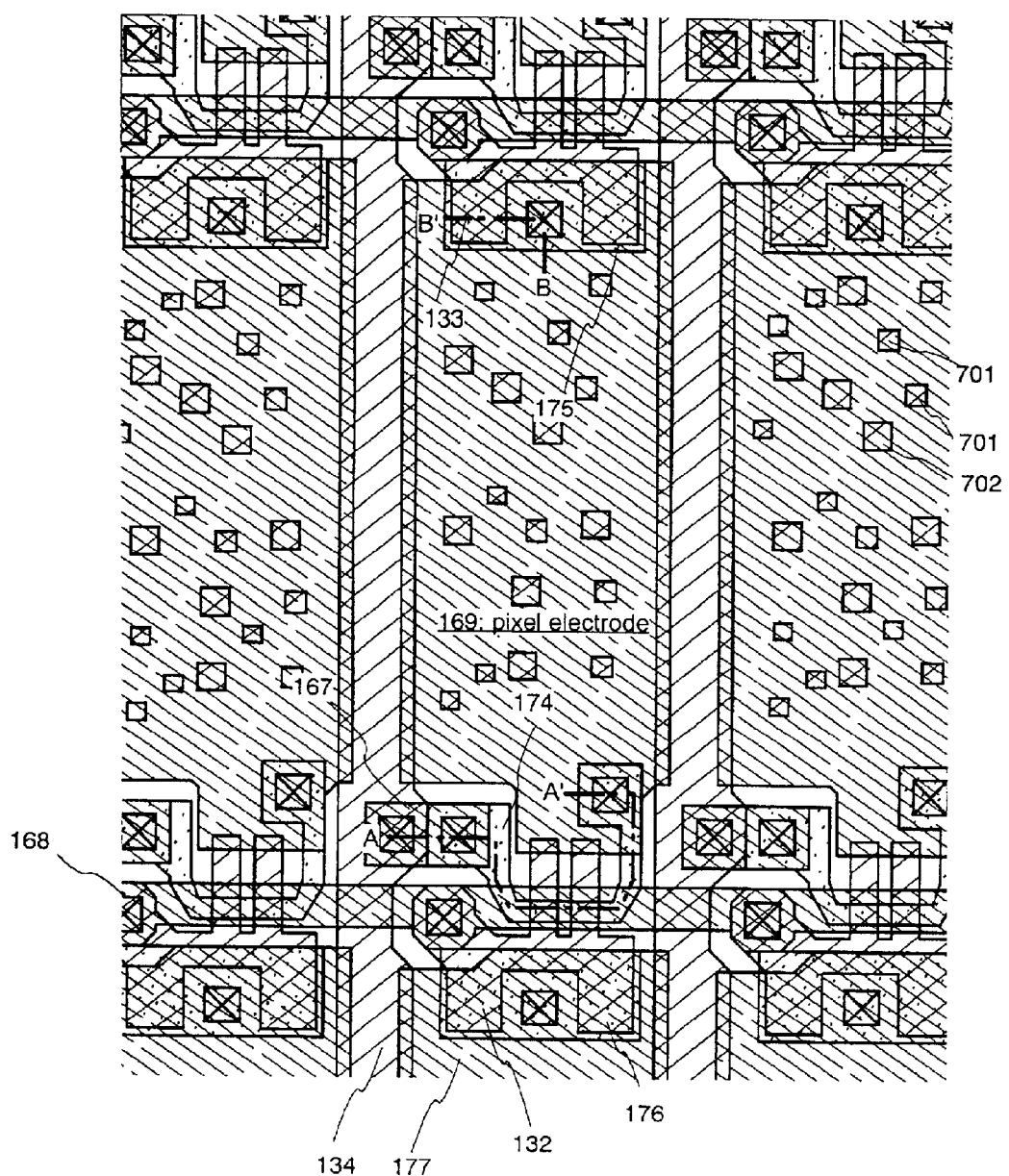
FIG. 5 is a view showing a top view of a pixel.
Figure 6A:
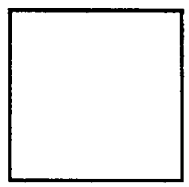
FIGS. 6A, 6B, 6C and 6D, 6E, 6F and 6G are views showing shapes of upper faces of projected portions.
Figure 6B:
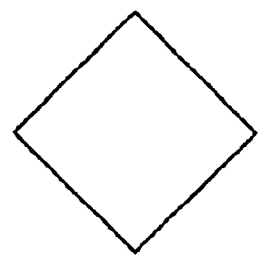
Figure 6C:
Figure 6D:
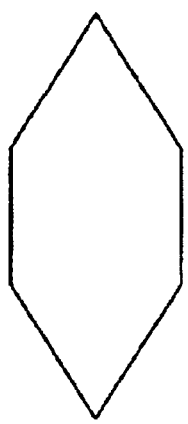
Figure 6E:
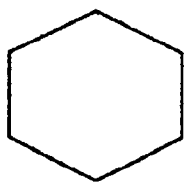
Figure 6F:
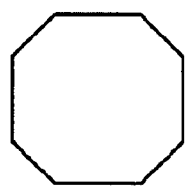
Figure 6G:
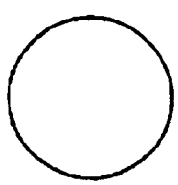

A top view of the pixel portion of the active matrix substrate manufactured in this embodiment is shown in FIG. 5. Note that the same reference numerals are used to indicate parts corresponding FIGS. 9 to 11. A dash line A–A' in FIG. 11 corresponds to a sectional view taken along the dash line A–A' in FIG. 5. Also, a dash line B–B' in FIG. 11 corresponds to a sectional view taken along the dash line B–B' in FIG. 5.

In addition, in accordance with the process steps of the present embodiment, the number of photo masks needed for the manufacture of the active matrix substrate may be made into five pieces (a semiconductor layer patterning mask, a first wiring patterning mask (including the first electrode 132, the second electrode 133, and the source wiring 134), a p-type TFT patterning mask, a second wiring patterning mask (including the pixel electrode 169, the connection electrode 167, and the gate wiring 168). As a result, it can contribute to shorten the manufacturing steps, to lower the manufacturing cost, and to improve the yields.

[Embodiment 2]

In Embodiment 2, a manufacturing process of an active matrix liquid crystal display device from an active matrix substrate formed in accordance with the Embodiment 1 will be described herein below. FIG. 4 is used for an explanation thereof.

First, in accordance with the Embodiment 1, an active matrix substrate in a state shown in FIG. 3 is obtained, and thereafter, an alignment film 408 is formed on the active matrix substrate of FIG. 4, and is subjected to a rubbing process. Note that, in this embodiment, before the formation of the alignment film 408, a spacer for maintaining a gap between the substrates is formed at a desired position by patterning an organic resin film such as an acrylic resin film. Further, spherical spacers may be scattered on the entire surface of the substrate in place of the columnar spacer.

Next, an opposed substrate 410 is prepared. In accordance with Embodiment 1, color layers 411, 412 and a leveling film 413 are formed on the opposed substrate 410. The red-color layer 411 and the blue-color layer 412 are partially overlapped with each other, thereby forming a second light shielding portion. Note that, although not shown in FIG. 4, the red-color layer and a green-color layer are partially overlapped with each other, thereby forming a first light shielding portion.

Subsequently, an opposing electrode 414 is formed in a pixel portion, and an alignment film 415 is formed on the entire surface of the opposed substrate. Then, the rubbing process is performed thereon.

Then, the active matrix substrate on which a pixel portion and a driver circuit are formed is stuck with the opposed substrate by a sealing member. In the sealing member, filler is mixed, and the two substrates are stuck with each other while keeping a uniform gap by the effect of this filler and the columnar spacer. Thereafter, a liquid crystal material 409 is injected between both substrates to seal the substrate completely by an end-sealing material (not shown). A known liquid crystal material may be used as the liquid crystal material 409. Thus the active matrix liquid crystal display device shown in FIG. 4 is completed.

In this embodiment, the substrate shown in Embodiment 1 is used. Accordingly, in FIG. 5 showing a top view of the pixel portion in accordance with Embodiment 1, light shielding must be performed at least gaps between the gate wiring 168 and the pixel electrodes 169, 177, a gap between the gate wiring 168 and the connection electrode 167, and a gap between the connection electrode 167 and the pixel electrode 169. In this embodiment, the opposed substrate is stuck so that the first light shielding portion and the second light shielding portion overlap with the positions which need to be shielded from light.

Figure 12:
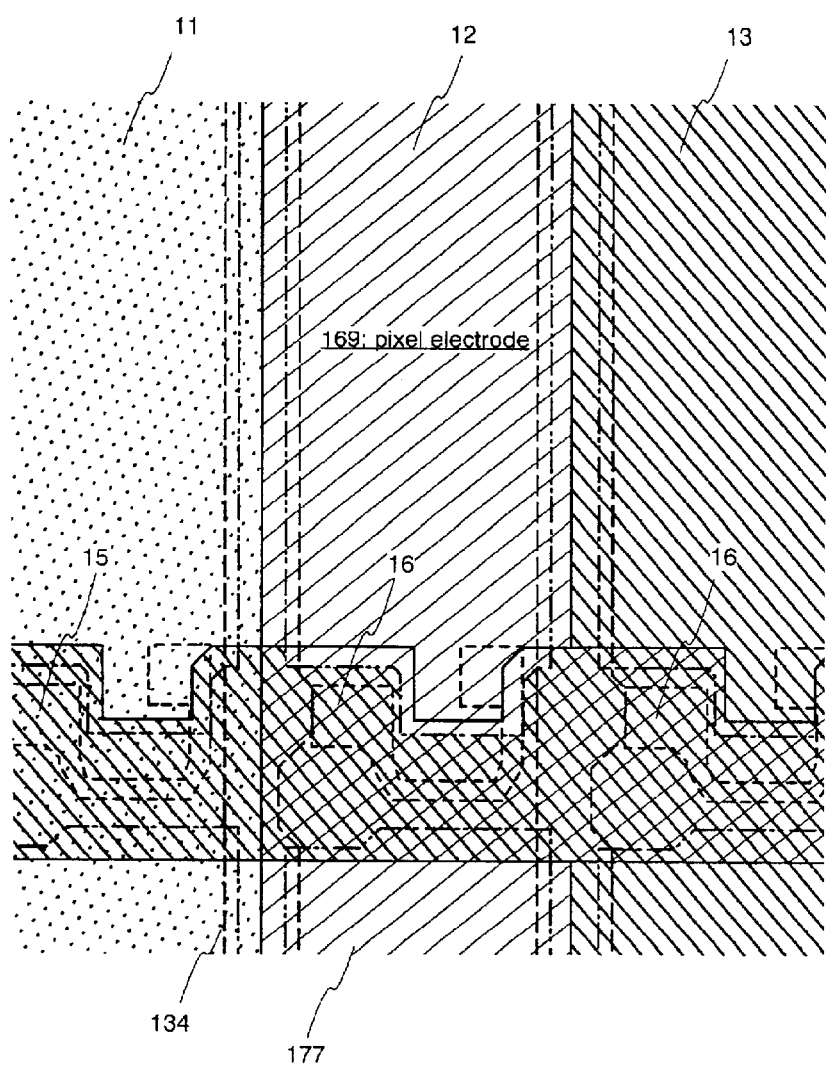
FIG. 12 is a view showing a top view of an arrangement of color layers.

Note that, FIG. 12 is a schematic view showing a part of the pixel portion of the completed liquid crystal display device. In FIG. 12, a color layer (B) 12 is formed so as to overlap with the pixel electrode 169 indicated by a dash line. Besides, the gap between the pixel electrode 169 and the adjacent electrode 177 is shielded from light by the second light shielding portion 16. This second light shielding portion 16 is formed from a color layer (B) and color layer (R) which are overlapped with each other. This second light shielding portion 16 also shields the pixel TFT of adjacent pixel (R) from light. Besides, an end portion of the color layer (B) 12 and an end portion of a color layer (G) 11 are formed on the source wiring 137 indicated by a dotted line. Further, a first light shielding portion 15 is formed by overlapping the color layer (G) and the color layer (R). In addition, in FIG. 12, a patterning is performed so that the end portion of the color layer (B) overlapping with the source wiring comes in contact with the end portion of the color layer (G). Besides, similarly, a pattering is performed so that an end portion of the color layer (R) overlapping with the source wiring is contacted with the end portion of the color layer (G).

Thus, without using a black mask, the gaps between the respective pixels are shielded from light by the first light shielding portion 15 and the second light shielding portion 16. As a result, the reduction of the manufacturing steps can be attained.

[Embodiment 3]

A structure of the active matrix liquid crystal display device obtained using Embodiment 2 (see FIG. 4) is explained with reference to the top view shown in FIG. 7. Note that portions corresponding to FIG. 4 are denoted by the same reference numerals.

Figure 7:
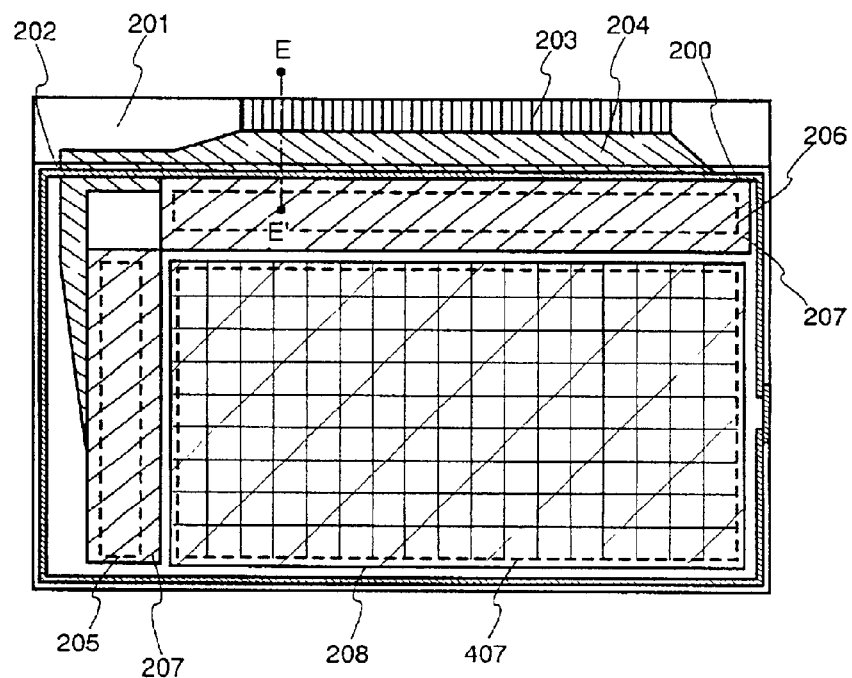
FIG. 7 is a view showing an outlook of AM-LCD.

In the top view shown in FIG. 7, an active matrix substrate 201 on which components such as a pixel portion, a driver circuit portion, an external input terminal 203 for attaching thereto an FPC (flexible printed circuit), and a wiring 204 for connecting the external input terminal to an input portion of each circuit are formed, and an opposed substrate 202 on which components such as color layers are formed, are joined, through the sealing member 200.

A light shielding portion 207 is formed on the opposed substrate side, above a gate wiring side driver circuit 205 and a source wiring side driver circuit 206, from a red color layer or a lamination of a red color layer and a blue color layer. Further, regarding a color layer 208 formed on the opposed substrate side above the pixel portion 407, red, green, and blue color layers are formed corresponding to each pixel. Color display is achieved by three colors from a red (R) color filter, a green (G) color layer, and a blue (B) color layer when performing actual display, but the arrangement of the color layers is arbitrary.

FIG. 8A shows a cross sectional view taken along the line E–E' of the external input terminal 203 shown in FIG. 7. The external input terminal is formed on the active matrix substrate side, and in order to reduce interlayer capacitance and wiring resistance, and prevent defects due to broken wirings, the external input terminal is connected to a wiring 211 formed from the same layer as the gate wiring by a wiring 209 formed from the same layer as the pixel electrode, through an interlayer insulating film 210.

Further, an FPC composed of a base film 212 and a wiring 213 is joined to the external input terminal by an anisotropic conductive resin 214. In addition, the mechanical strength is increased by a reinforcing plate 215.

FIG. 8B shows a detailed diagram thereof, and shows a cross sectional view of the external input terminal shown in FIG. 8A. The external input terminal formed on the active matrix substrate side is composed of the wiring 211, which is formed from the same layer as the first electrode and the source wiring, and of the wiring 209, which is formed from the same layer as the pixel electrode. Of course, this is merely an example showing the structure of a terminal portion, and the terminal portion may be formed from only one of the wirings. For example, when forming it from the wiring 211 which is formed of the same layer as the first electrode and the source wiring, it is necessary to remove the interlayer insulating film formed on the wiring 211. The wiring 209, which is formed from the same layer as the pixel electrode, has a two-layer structure of a Ti film 209a, an alloy film (an alloy film of Al and Ti) 209b. The FPC is composed of the base film 212 and the wiring 213. The wiring 213 and the wiring 209 formed from the same layer as the pixel electrode are joined by an anisotropic conductive adhesive composed of a thermosetting adhesive 214 and conductive particles 216 dispersed therein, forming an electrically connected structure.

An active matrix liquid crystal display device thus manufactured can be used as a display unit of all types of electronic device.

[Embodiment 4]

According to the embodiment, a detailed description will be given of the example shown in Embodiment 2, that is, an arrangement of color layers provided at an opposed substrate (FIG. 12).

FIG. 13A shows an example of pertinently forming three colors of color layers 11 through 13 and constituting a first light shielding portion 15, a second light shielding portion 16 and pixel opening portions 17 through 19. Generally, a color layer is formed by using a color resist comprising an organic photosensitive material dispersed with a pigment.

The first light shielding portion 15 and the second light shielding portion 16 are formed to shield gaps among respective pixels. Therefore, incident light is absorbed by the first light shielding portion 15 and the second light shielding portion 16 and is recognized substantially as black color by an observer. Further, the first light shielding portion 15 and the second light shielding portion 16 are formed to overlap a pixel TFT (not illustrated here) of an element substrate and plays a role of protecting the pixel TFT from outside light.

The first light shielding portion 15 is formed by laminating the color layer 11 of green color and the color layer 13 of red color. The color layer 13 of red color is patterned in a shape of a lattice. Further, the color layer 11 of green color is patterned in the same shape as that of the conventional example (stripe shape).

Further, the second light shielding portion 16 is formed by laminating the color layer 12 of blue color and the color layer 13 of red color. Further, the color layer 12 of blue color is patterned in a shape partially overlapping the color layer 13 of red color contiguous thereto.

Further, FIG. 13B shows a sectional structure produced by cutting the first light shielding portion and the second light shielding portion in FIG. 13A by a chain line (A1–A1'). As shown in FIG. 13B, the color layer 13 is laminated to cover the color layers 11 and 12 on an opposed substrate 10, further, the color layer 13 is covered by a leveling film 14.

Figure 29:
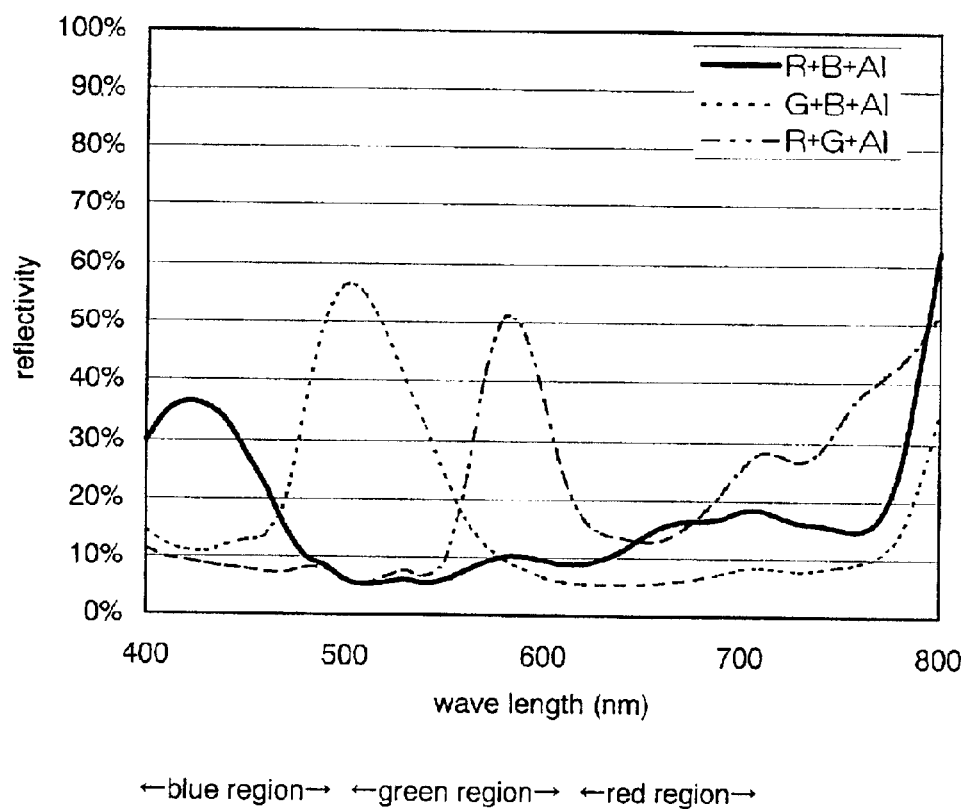
FIG. 29 is a diagram showing reflectivity of laminated color layers.

Further, FIG. 29 shows reflectivity respectively of a film laminated with the color layer 11 of green color and the color layer 13 of red color (first light shielding portion 15), a film laminated with the color layer 12 of blue color and the color layer 13 of red color (second light shielding portion 16) and a film laminated with the color layer of green color and the color layer of blue color.

As shown in FIG. 29, R+B+Al (corresponding to second light shielding portion 16) is provided with a reflectivity of about 35% in a wavelength region of 400 through 450 nm and sufficiently functions as a light shielding mask. Further, R+G+Al (corresponding to first light shielding portion 15) sufficiently functions as a light shielding mask although there is provided a reflectivity of about 50% at a vicinity of the wavelength of 570 nm.

Further, there is observed a tendency that a non-single crystal silicon film forming an activation layer of TFT is liable to absorb light at a wavelength region of 500 nm. At the wavelength region of 500 nm, the first light shielding portion 15 and the second light shielding portion 16 can restrain the reflectance to be equal to or smaller than 10% and accordingly, a deterioration of TFT by light can be restrained.

In this way, the embodiment is characterized in that the light shielding mask is formed by the laminated film comprising two layers of color layers (R+B or R+G). As a result, a step of forming a black matrix can be dispensed with and the number of steps are reduced.

Figure 30:
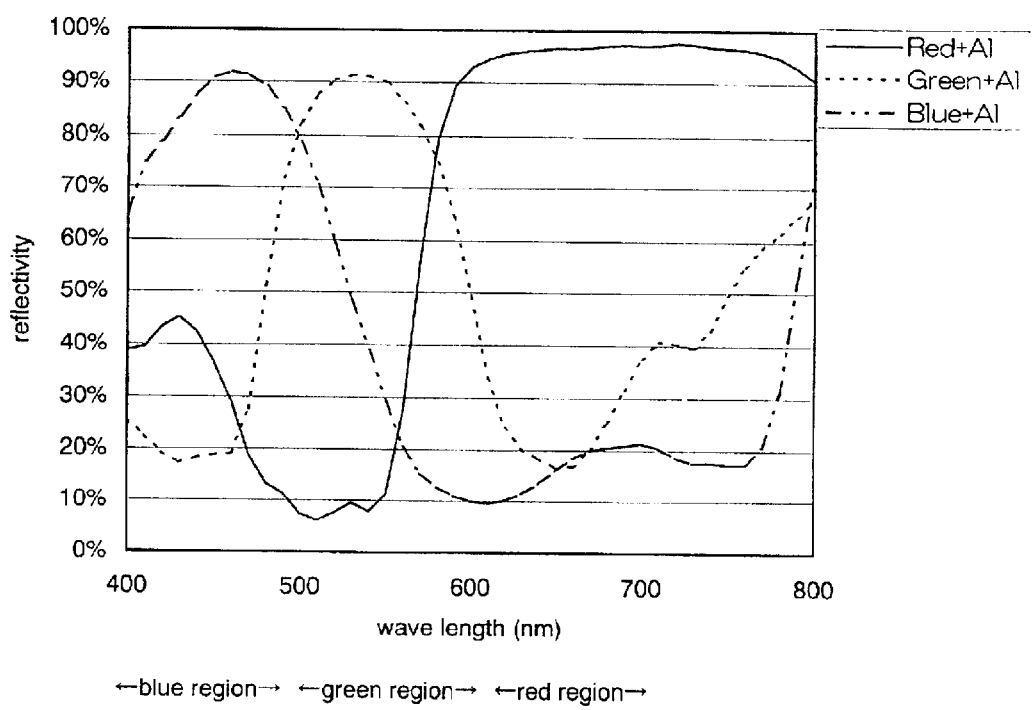
FIG. 30 is a diagram showing reflectivity of a single layer of color layers.

Further, in the pixel opening portions similar to the conventional example, shown in FIG. 30 (reflectivity of single layer), the color layer of blue color shows a reflectivity exceeding 90% at a vicinity of 450 nm. Further, the color layer of green color shows a reflectivity exceeding 90% at a vicinity of 530 nm. Further, the color layer of red color shows a reflectivity exceeding 90% in a wavelength region of 600 through 800 nm.

However, the sectional view shown in FIG. 13B is only an example, the invention is not particularly limited thereto, for example, after initially forming the color layer (R), the color layer (B) and the color layer (G) may be laminated, after initially forming the color layer (G), the color layer (R) may be formed and successively, the color layer (B) may be formed, or after initially forming the color layer (B), the color layer (R) may be formed and successively, the color layer (G) may be laminated.

Figure 14A:
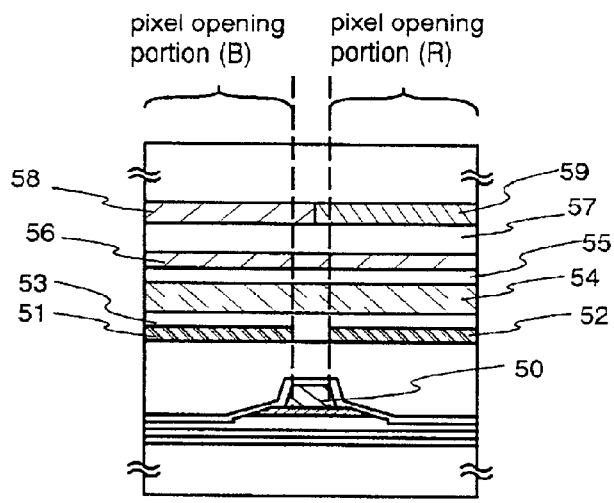
FIGS. 14A, 14B and 14C are views showing sectional views of an arrangement of color layers.
Figure 14B:
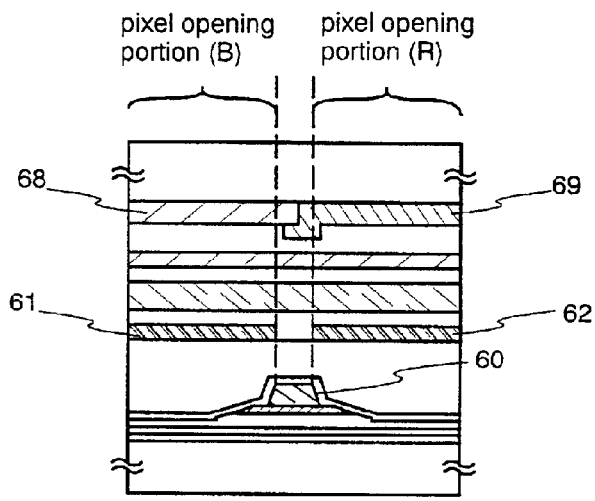
Figure 14C:
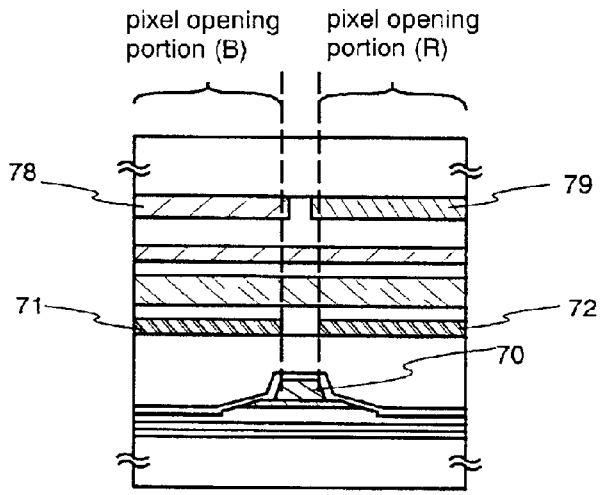

Further, FIGS. 14A, 14B and 14C show positional relationships among wirings between pixel electrodes, the pixel electrodes and color layers. FIG. 14A shows an example in which end faces of a color layer (B) 58 and a color layer (R) 59 are brought into contact with each other above a source wiring 50 to shield an interval between a pixel electrode 51 and a pixel electrode 52 and a contact face thereof is present above the source wiring. Further, in FIG. 14A, numerals 53 and 55 designate alignment films, numeral 54 designates a liquid crystal, numeral 56 designates an opposed electrode and numeral 57 designates a leveling film.

Further, the invention is not limited to the example shown by FIG. 14A but there may be constructed a structure shown by FIG. 14B or FIG. 14C in consideration of a deviation in patterning color layers. FIG. 14B shows an example of forming a color layer (R) 69 to partially overlap an end portion of the color layer (B) 68 above a source wiring 60 to shield an interval between a pixel electrode 61 and a pixel electrode 62. Further, FIG. 14C shows an example of forming a color layer (B) 78 and a color layer (R) 79 above a source wiring 70 such that the color layer (B) 78 and the color layer (R) 79 are not brought into contact with each other to shield an interval between a pixel electrode 71 and a pixel electrode 72.

[Embodiment 5]

In this embodiment, an explanation will be given of a method of fabricating an active matrix substrate which is different from that in Embodiment 1 in reference to FIGS. 15A through 17. Although in Embodiment 1, there is formed an impurity region by adding an impurity element for providing n-type in a self-aligning manner, the embodiment is characterized in that the number of masks is increased by one sheet and a source region or a drain region of an n-channel type TFT is formed.

Further, other constitution has already been described in Embodiment 1 and accordingly, reference is given to Embodiment 1 with respect to a detailed constitution thereof and an explanation thereof will be omitted here.

Figure 18A:
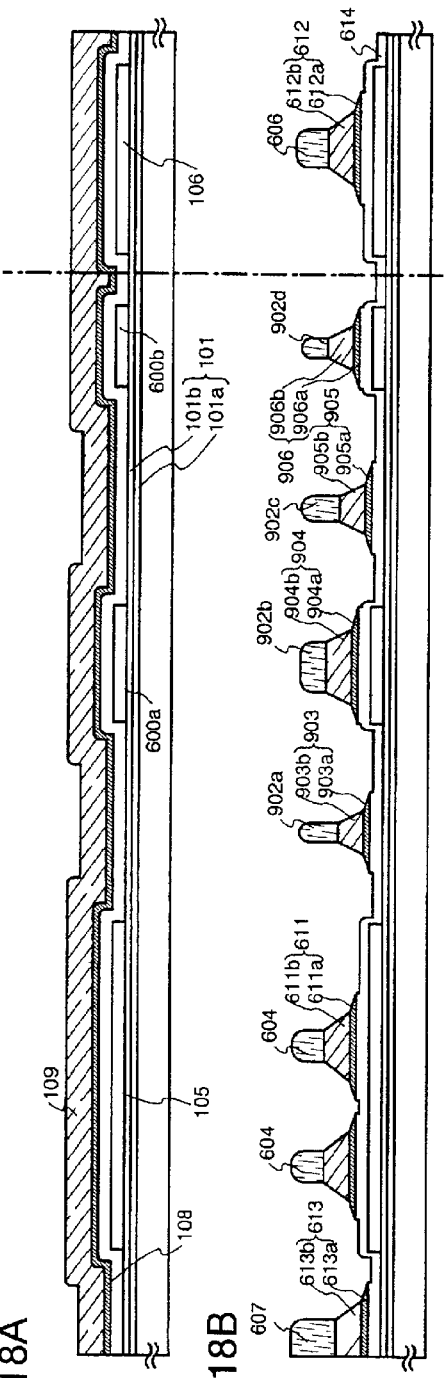
FIGS. 18A, 18B, 18C and 18D are views showing steps of fabricating AM-LCD (pixel portion)

First, in accordance with Embodiment 1, there is provided the same state as that of FIG. 9A. A drawing in correspondence with FIG. 9A is FIG. 15A and the same reference numerals are used. Further, FIG. 15A and FIG. 18A correspond to each other and the same reference numerals are used. As shown in FIG. 18A, at a pixel portion 803, there are formed semiconductor layers 600$a$ and 600$b$ simultaneously with forming a semiconductor layer 105.

Next, by using a photolithography process, there are formed masks 601 through 607 comprising resists and there is carried out a first etching process for forming electrodes and wirings. Further, as a gas for etching, there can pertinently be used a chlorine species gas represented by $Cl_2$, $BCl_3$, $SiCl_4$, $CCl_4$, a fluorine species gas represented by $CF_4$, $SF_6$, $NF_3$, or $O_2$. According to the embodiment, etching is carried out by using an ICP etching process, using $CF_4$ and $Cl_2$ as gases for etching and generating plasma by inputting RF (13.56 MHz) power of 500 W to a coil type electrode under pressure of 1 Pa. RF (13.56 MHz) power of 20 W is inputted also to a substrate side (sample stage) and substantially negative self bias voltage is applied. Both of a W film and a TaN film are etched to the same degree under etching conditions mixed with $CF_4$ and $Cl_2$. Further, in order to carry out etching without leaving residue on a gate insulating film, etching time may be increased by a rate of about 10 through 20%.

By the first etching process, end portions of a first conductive layer and a second conductive layer are formed in taper shape owing to an effect of the bias voltage applied to the substrate side. An angle of the taper portion becomes 15 through 45°. By etching the W film and the TaN film in this way, there are formed conductive layers 608 through 613 (first conductive layers 608a through 613a and second conductive layers 608b through 613b). Numeral 614 designates a gate insulating film and there are formed regions etched to thin by about 20 through 50 nm at regions which are not covered by the conductive layers 608 to 613 having the first shape. (FIG. 15(B).

Figure 18B:
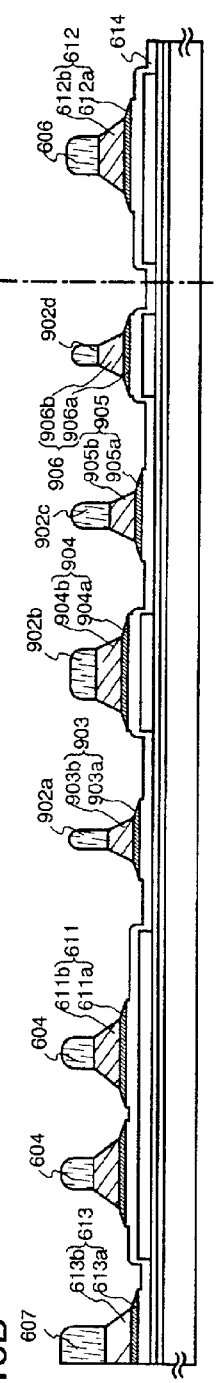

Further, FIG. 15B and FIG. 18B correspond to each other and the same reference numerals are used. As shown in FIG. 18B, at a pixel portion 803, conductive layers 903 through 906 having a first shape are formed by using masks 902a through 902d comprising resists simultaneously with forming the conductive layer 611 having the first shape.

Next, a second etching process is carried out without removing masks 601 through 607 comprising resists. There are used $CF_4$, $Cl_2$ and $O_2$ as gases for etching and etching is carried out by generating plasma by inputting RF (13.56 MHz) power of 500 W to a coil type electrode under pressure of 1 Pa. RF (13.56 MHz) power of 20 W is inputted to the substrate side (sample stage) and self bias voltage lower than that in the first etching process is applied. The W film is etched by the etching condition.

The W film is subjected to anisotropic etching by the second etching process, further, the TaN film constituting the first conductive layer is slightly etched by an etching rate slower than that of the W film and there are formed conductive layers 615 through 620 (first conductive layers 615a through 620a and second conductive layers 615b through 620b) having a second shape. Numeral 621 designates a gate insulating film and regions which are not covered by the conductive layers 615 through 620 having the second shape, are etched to thin.

Next, a first doping process is carried out. The doping process may be carried out by an ion doping process or an ion implantation process. In this case, an impurity element providing n-type is doped under high acceleration voltage condition. Although as an impurity element for providing n-type, there is used an element belonging to 15 group, typically, phosphorus (P) or arsenic (As), in this case, phosphorus (P) is used. For example, the acceleration voltage is set to 70 through 120 keV and impurity regions (A) 622 through 626 are formed. (FIG. 15C) In doping, the conductive layers 615 through 619 having the second shape are used as masks against the impurity element and the doping is carried out such that the impurity element is added also to semiconductor layers on lower sides of taper portions of the second conductive layers 615a through 619a. Among the impurity regions (A) 622 through 626 which are formed in a self-aligning manner, impurity regions overlapping the conductive layers 615 through 619 are designated by notations 622b, 623b, 624b, 625b and 626b and impurity regions not overlapping the conductive layers 615 through 619 are designated by notations 622a, 623a, 624a, 625a and 626a.

Figure 18C:
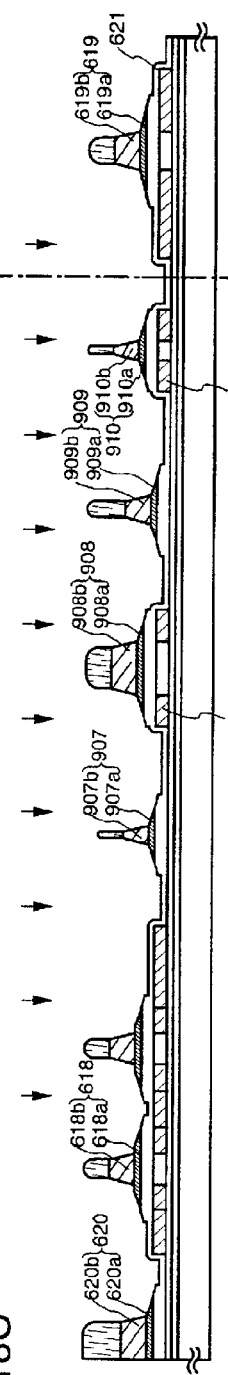

Further, FIG. 15C are and FIG. 18C correspond to each other and the same reference numerals are used. As shown in FIG. 18C, at the pixel portion 803, the conductive layers 907 through 910 having the second shape are formed simultaneously with forming the conductive layer 618 having the second shape. Further, as shown in FIG. 18C, at the pixel portion 803, there are formed impurity regions (A) 911.

Next, after removing the masks comprising resists, the conductive layers 615 through 619 are used as masks, the gate insulating film 621 is selectively removed and insulating layers 627a, 627b and 627c are formed. Further, the resist masks used for forming the conductive layers 615 through 619 having the second shape may be removed simultaneously with forming the insulating layers 627a, 627b and 627c. (FIG. 15D).

Figure 18D:
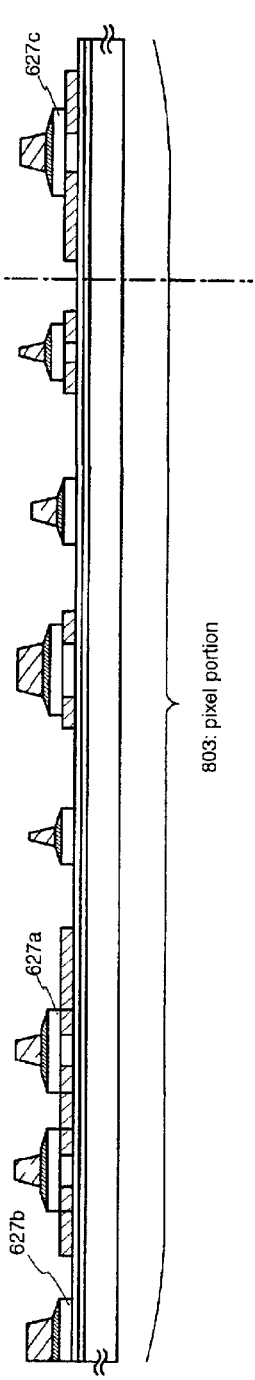

Further, FIG. 15D and FIG. 18D correspond to each other and the same reference numerals are used.

Next, after forming masks 628 and 629 comprising resists by using a photolithography process, a second doping process is carried out. In this case, an impurity element providing n-type is doped to the semiconductor layer by making a dose amount thereof larger than that in the first doping process under low acceleration voltage condition. The impurity element providing n-type is added to impurity regions (B) 630 through 634 at a concentration range of $1 \times 10^{20}$ through $1 \times 10^{21}$ atoms/$cm^3$. (FIG. 16A)

Figure 16A:
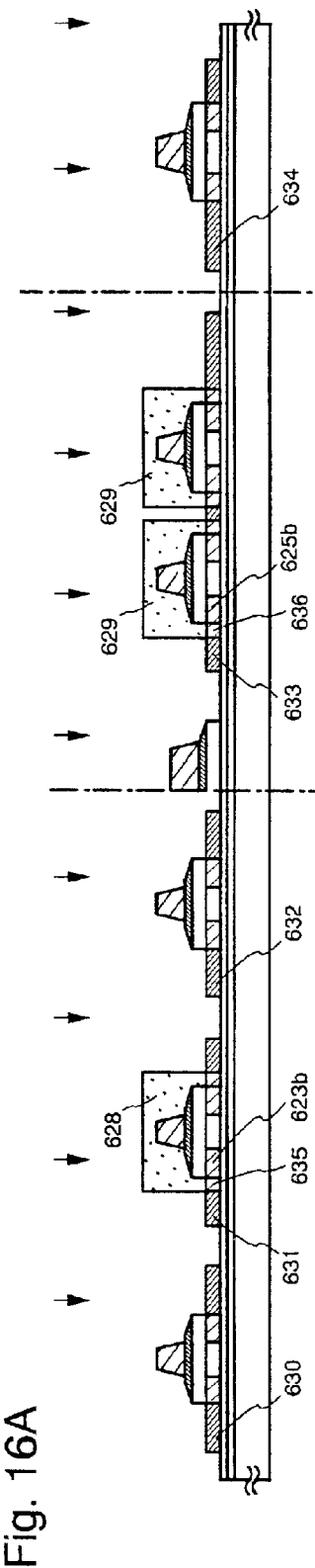
FIGS. 16A, 16B and 16C are views showing steps of fabricating AM-LCD.

Further, FIG. 16A and FIG. 19A correspond to each other and the same reference numerals are used.

In this way, there can be formed impurity regions (B) 630, 632 and 633 constituting a source region or a drain region of an n-channel type TFT. Further, in the pixel portion, there is formed a region 636 not overlapping the conductive layer 618 is formed between an impurity region (A) 625b overlapping the conductive layer 618 and the impurity region 633. The region 636 functions as an LDD region of the n-channel type TFT. Further, the impurity element added to the impurity regions (B) 631 and 634 are added for reducing a concentration of nickel in the semiconductor layer mainly constituting a channel forming region in a later gettering step.

Further, after removing the masks 628 and 629 comprising resists similar to Embodiment 1, masks 637 through 639 comprising resists are newly formed and a third doping process is carried out. (FIG. 16B)

Figure 16B:
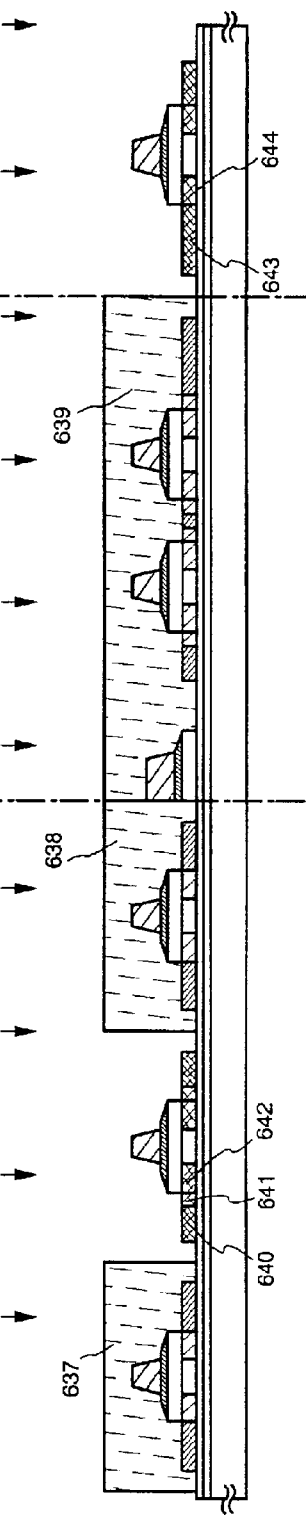

Further, FIG. 16B and FIG. 19B correspond to each other and the same reference numerals are used.

By the third doping process, there are formed impurity regions (C) 640 through 644 added with an impurity element for providing a conductive type reverse to the conductive type, mentioned above, to the semiconductor layer constituting an activation layer of a p-channel type TFT. The impurity regions (C) are formed in a self-aligning manner by adding an impurity element providing p-type by using the second conductive layers 616 and 619 as masks against the impurity element. According to the embodiment, the impurity regions (C) 640 through 644 are formed by an ion doping process using diborane ($B_2H_6$). Further, although similar to Embodiment 1, the impurity regions (C) 640 through 644 are respectively added with phosphorus by different concentrations, at any of the regions, by carrying out the doping process such that the concentration of the impurity element providing p-type falls in a range of $2 \times 20^{20}$ through $2 \times 20^{21}$ atoms/$cm^3$, the regions function as a source region and a drain region of a p-channel type TFT and accordingly, no problem is posed.

Next, the masks 637 through 639 comprising resists are removed similar to Embodiment 1 and there is formed a first interlayer insulating film 645 covering the total surface. The first interlayer insulating film 645 is formed by an insulating film including silicon having a thickness of 100 through 200 nm by using a plasma CVD process or a sputtering process.

Figure 16C:
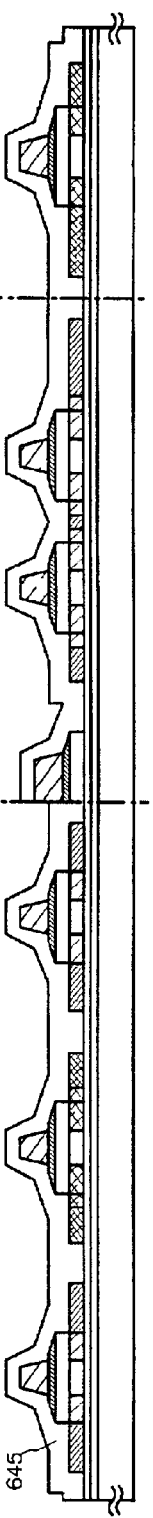
Figure 17:
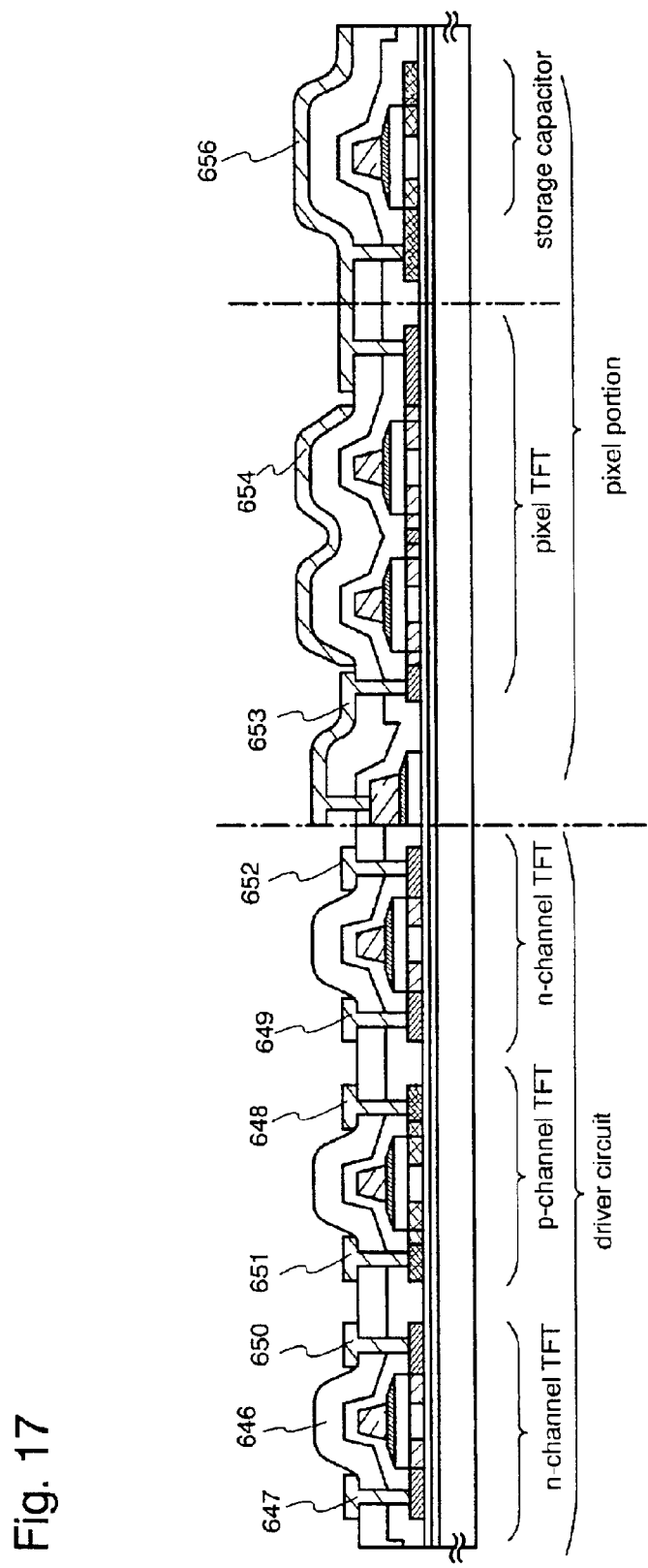
FIG. 17 is a view showing a step of fabricating AM-LCD.

Next, as shown in FIG. 16C, there is carried out a step of activating the impurity elements added to the respective semiconductor layers. The activating step is carried out by a thermal annealing process using a furnace annealing furnace. The thermal annealing process may be carried out at 400 through 700° C., representatively, 500 through 550° C. in a nitrogen atmosphere. Further, other than the thermal annealing process, a laser annealing process or a rapid thermal annealing process (RTA process) is applicable.

Further, according to the embodiment, simultaneously with the activating process, nickel used as a catalyst in crystallization is gettered by the impurity regions (B) 630 through 634 including a high concentration of phosphorus and a concentration of nickel in the semiconductor layer mainly constituting a channel forming region is reduced. According to TFT having the channel forming region fabricated in this way, the off current value is reduced, the crystallizing performance is excellent and therefore, high field effect mobility is provided and excellent characteristic can be achieved.

Further, FIG. 16C and FIG. 19C correspond to each other and the same reference numerals are used.

Further, the activating process may be carried out prior to forming the first interlayer insulating film 645. However, when a wiring material used for the conductive layers 615 through 619 having the second shape is weak at heat, it is preferable to carry out the activating process after forming the interlayer insulating film (insulating film having a major component of silicon, for example, silicon nitride film) for protecting wirings and the like as in the embodiment.

The impurity regions are formed at the respective semiconductor layers by the above-described steps. The conductive layers 615 through 618 having the second shape overlapping the semiconductor layers function as gate electrodes. Further, the layer 620 functions as a source wiring and the layer 619 functions as a second electrode for forming a storage capacitor.

Further, there is carried out a step of hydrogenating the semiconductor layers by carrying out a heat treatment at 300 through 550° C. for 1 through 12 hours in a nitrogen atmosphere including 3% of hydrogen. Further, the heat treatment may be carried out in an atmosphere including 3 through 100% of hydrogen. As other means for hydrogenation, there may be carried out plasma hydrogenation (using hydrogen excited by plasma).

Further, there may be carried out a step of hydrogenating the semiconductor layers by carrying out a heat treatment (heat treatment at 300 through 550° C. for 1 through 12 hours) by utilizing hydrogen included in the interlayer insulating film comprising a silicon nitride film. In this case, when there is carried out a heat treatment at 410° C. for 1 hour in a nitrogen atmosphere, dangling bond of the semiconductor layers can be terminated by hydrogen included in the interlayer insulating film.

Further, when a laser annealing process is used as the activating process, after carrying out the hydrogenation, it is preferable to irradiate laser beam such as excimer laser or YAG laser.

Next, there is formed a second interlayer insulating film 646 comprising an organic resin material above the first interlayer insulating film 645. Although according to the embodiment, the organic resin material is used, the invention is not particularly limited thereto but there may be used an insulating film including silicon (silicon oxynitride film, silicon oxide film, silicon nitride film) as a single layer or a laminated structure. Next, there is carried out patterning for forming a contact hole reaching the source wiring 134 and contact holes reaching the respective impurity regions (B) and (C) 630, 632, 633, 640 and 643.

Further, there are formed wirings 647 through 652 for electrically connecting respectively to the impurity region (B) or the impurity region (C) in a driver circuit. Further, these wirings are formed by patterning a laminated film of a Ti film having a film thickness of 50 nm and an alloy film (alloy film of Al and Ti) having a film thickness of 500 nm.

Further, at the pixel portion, there are formed a pixel electrode 656, a gate wiring 654 and a connection electrode 653. (FIG. 17) By the connection electrode 653, the source wiring 620 is electrically connected to the pixel TFT. Further, the gate wiring 654 is electrically connected to the first electrode (conductive layer 618 having second shape). Further, the pixel electrode 656 is electrically connected to the drain region of the pixel TFT and is electrically connected to the semiconductor layer 643 functioning as one electrode for forming the storage capacitor.

In this way, there can be formed the driver circuit having the n-channel type TFT, the p-channel type TFT and the n-channel type TFT and the pixel portion having the pixel TFT and the storage capacitor on the same substrate. In the specification, such a substrate is referred to as active matrix substrate for convenience.

The semiconductor layer of the n-channel type TFT of the driver circuit is provided with the impurity region (A) 622*b* (GOLD region) overlapping the conductive layer 615 having the second shape forming the gate electrode and the impurity region (B) 630 functioning as the source region or the drain region. Further, the semiconductor layer of the p-channel type TFT is provided with the channel forming region, the impurity region (C) 642 overlapping the conductive layer 616 having the second shape forming the gate electrode and the impurity region (C) 640 functioning as the source region or the drain region. Further, the semiconductor layer of the n-channel type TFT is provided with the impurity region (A) 624*b* (GOLD region) overlapping the conductive layer 617 having the second shape forming the gate electrode and the impurity region (B) 632 functioning as the source region or the drain region.

The semiconductor layer of the pixel TFT of the pixel portion is provided with the channel forming region, the impurity region (A) 625*b* (GOLD region) overlapping the conductive layer 618 having the second shape forming the gate electrode, the impurity region 636 (LDD region) formed at an outer side of the gate electrode and the impurity region (B) 633 functioning as the source region or the drain region. Further, the semiconductor layers 643 and 644 functioning as one electrode of the storage capacitor, are respectively added with the impurity element for providing p-type at the same concentration as that of the impurity region (C). The storage capacitor is formed by the second electrode 619 and the semiconductor layers 643 and 644 with an insulating layer 627*c* (the same film as gate insulating film) as a dielectric member.

Figure 20:
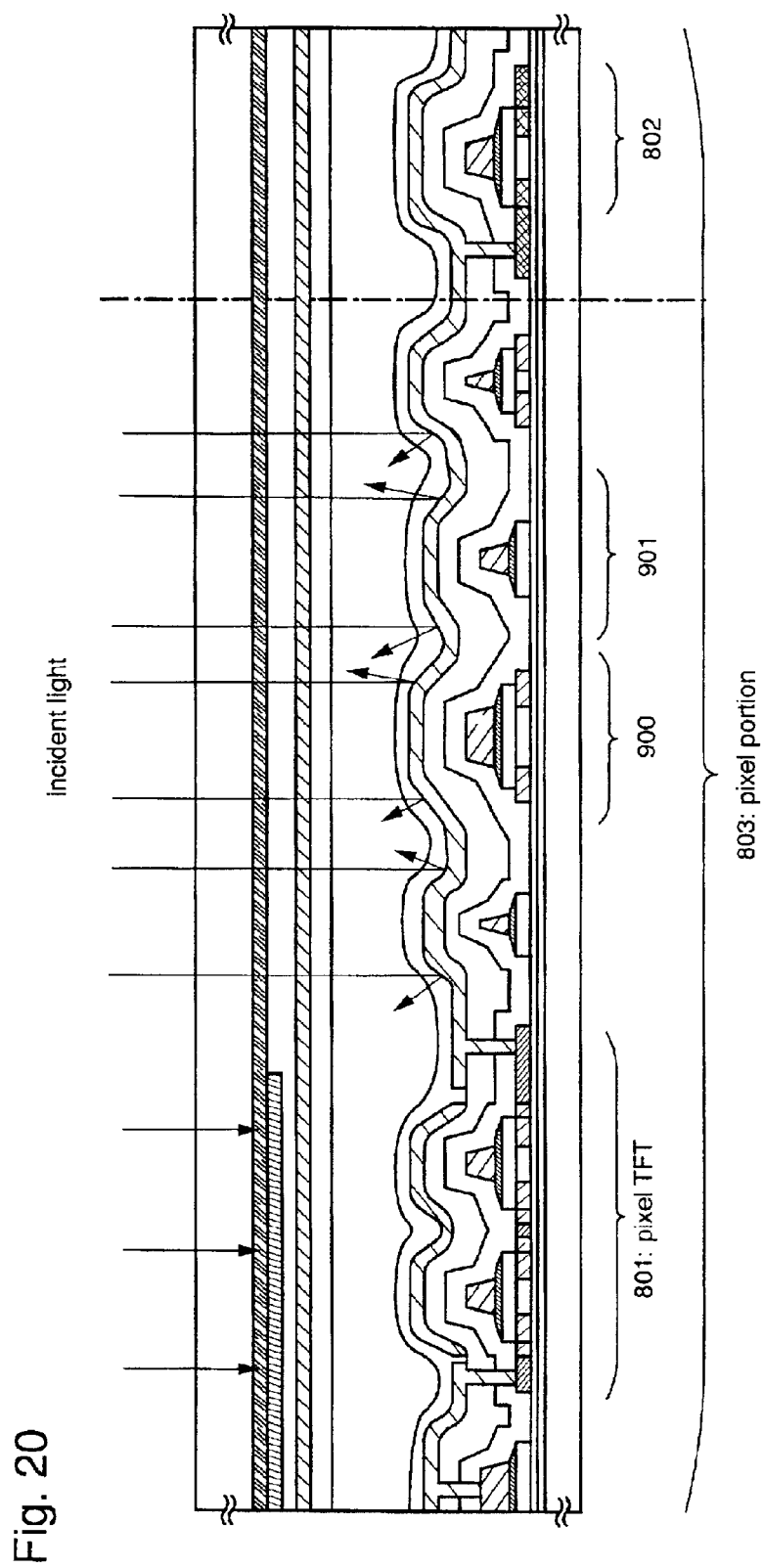
FIG. 20 is a view showing a sectional structure of an active matrix type liquid crystal display device.

Further, there is provided a liquid crystal display device shown in FIG. 20 in accordance with steps of Embodiment 2 by using the active matrix substrate fabricated in the embodiment. As shown in FIG. 20, there are formed projected portions 900 and 901 having different heights at the pixel portion 803. The projected portions 900 and 901 can be formed without increasing the number of masks. In FIG. 20, in patterning the semiconductor layer, there is used a mask which does not form the semiconductor layer at the projected portion 901 and accordingly, the height of the projected portion 901 becomes lower than the projected portion 900 by an amount of the film thickness of the semiconductor layer.

Thereby, a difference of heights between a projected portion and a recessed portion formed at the surface of the pixel electrode can be increased and reflected light can further be scattered without increasing the number of steps.

Further, the embodiment can be combined with any of Embodiments 1 through 4.

[Embodiment 6]

According to the embodiment, an explanation will be given of a method of fabricating an active matrix substrate different from that of Embodiment 1 in reference to FIGS. 21A, 21B and 21C and FIGS. 22A, 22B and 22C. Although the embodiment is different from Embodiment 1 in a method of fabricating a gate electrode and an order of doping, a step of activating process and thereafter stay the same.

Figure 21:
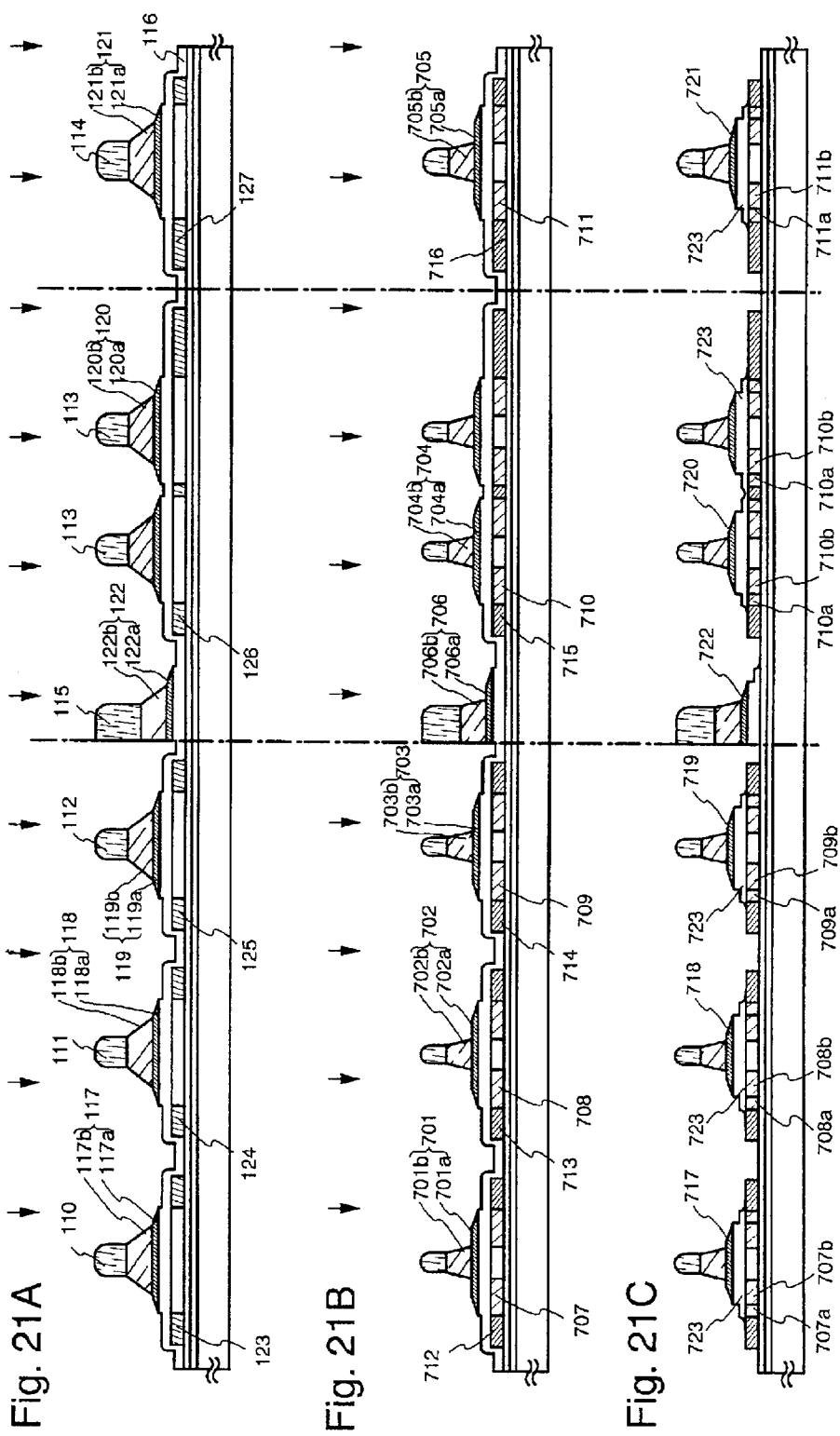
FIGS. 21A, 21B and 21C are views showing steps of fabricating AM-LCD.

First, in accordance with Embodiment 1, the first etching process is carried out and thereafter, the first doping process is carried out to thereby provide the state of FIG. 9B. FIG. 21A is the same as FIG. 9B and the same reference numerals are used.

Next, the second etching process is carried out without removing the mask comprising a resist. $CF_4$ and $Cl_2$ and $O_2$ are used for an etching gas and the W film is selectively etched. At this occasion, there are formed second conductive layers 701b through 706b by the second etching process. Meanwhile, the first conductive layers 117a through 122a are hardly etched and first conductive layers 701a through 706a are formed. Next, by carrying out a second doping process, a state of FIG. 21B is provided. In doping, the first conductive layers 701a through 706a are used as masks against an impurity element and the doping is carried out such that the impurity element is added to semiconductor layers on lower sides of taper portions of second conductive layers. In this way, there are formed impurity regions 707 through 711 overlapping the second conductive layers. A concentration of phosphorus (P) added to the impurity region is provided with a gradual concentration gradient in accordance with a film thickness of the taper portion of the second conductive layer. Further, in the semiconductor layer overlapping the taper portion of the second conductive layer, from an end portion of the taper portion of the second conductive layer toward an inner side, the impurity concentration is more or less reduced, however, the concentration stays to be substantially the same degree. Further, the first impurity regions 123 through 127 are also added with the impurity element to thereby form impurity regions 712 through 716.

Next, a third etching process is carried out without removing the mask comprising a resist. The third etching process is carried out for partially etching a taper portion of the second conductive layer and reducing a region overlapping the semiconductor layer. The third etching is carried out by using $CHF_3$ for an etching gas and using a reactive ion etching process (RIE process). By the third etching, there are formed second conductive layers 717 through 722. At this occasion, the insulating film 116 is simultaneously etched and there is formed an insulating film 723.

By the third etching, there are formed impurity regions (LDD regions) 707a through 711a not overlapping the second conductive layers 717 through 722. Further, impurity regions (GOLD region) 707b through 711b stay to overlap the second conductive layers 717 through 721.

Thereby, according to the embodiment, in comparison with Embodiment 1, a difference between the impurity concentration at the impurity regions (GOLD region) 707b through 711b overlapping the second conductive layers 717 through 721 and the impurity concentration at the impurity regions (LDD regions) 707a through 711a not overlapping the second conductive layers 717 through 721, can be reduced an reliability can be promoted.

Next, after removing the mask comprising a resist, there are formed masks 724 through 726 comprising resists are newly formed and a third doping process is carried out. By the third doping process, there are formed impurity regions 727 through 732 added with an impurity element for providing a conductive type reverse to the conductive type, mentioned above, to the semiconductor layer for constituting an activation layer of a p-channel type TFT. The first conductive layers 701b through 705b are used as masks against the impurity element and the impurity element for providing p-type is added to thereby form the impurity regions in a self-aligning manner. According to the embodiment, the impurity regions 727 through 732 are formed by an ion doping process using diborane ($B_2H_6$). In the third doping process, the semiconductor layer for forming the n-channel type TFT is covered by the masks 724 through 726 comprising resists. Although the impurity regions 727 through 732 are respectively added with phosphorus by different concentrations by the first doping process and the second doping process, by carrying out the doping process in any of the regions such that the concentration of the impurity element for providing p-type becomes $2 \times 10^{20}$ through $2 \times 10^{21}$ atoms/cm$^3$, the regions function as the source region and the drain region of the p-channel type TFT and accordingly, no problem is posed. According to the embodiment, a portion of the semiconductor layer for constituting the activation layer of the p-channel type TFT is exposed and therefore, there is an advantage that the impurity element (boron) is easier to add than in Embodiment 1.

By the above-described steps, the respective semiconductor layers are formed with the impurity regions.

Next, the masks 724 through 726 comprising resists are removed and a first interlayer insulating film 733 is formed. The first interlayer insulating film 733 is formed by an insulating film including silicon having the thickness of 100 through 200 nm by using a plasma CVD process or a sputtering process. According to the embodiment, a silicon oxynitride film having a film thickness of 150 nm is formed by a plasma CVD process. Naturally, the first interlayer insulating film 733 is not limited to the silicon oxynitride film but other insulating film including silicon may be used as a single layer or a laminated structure.

Figure 22:
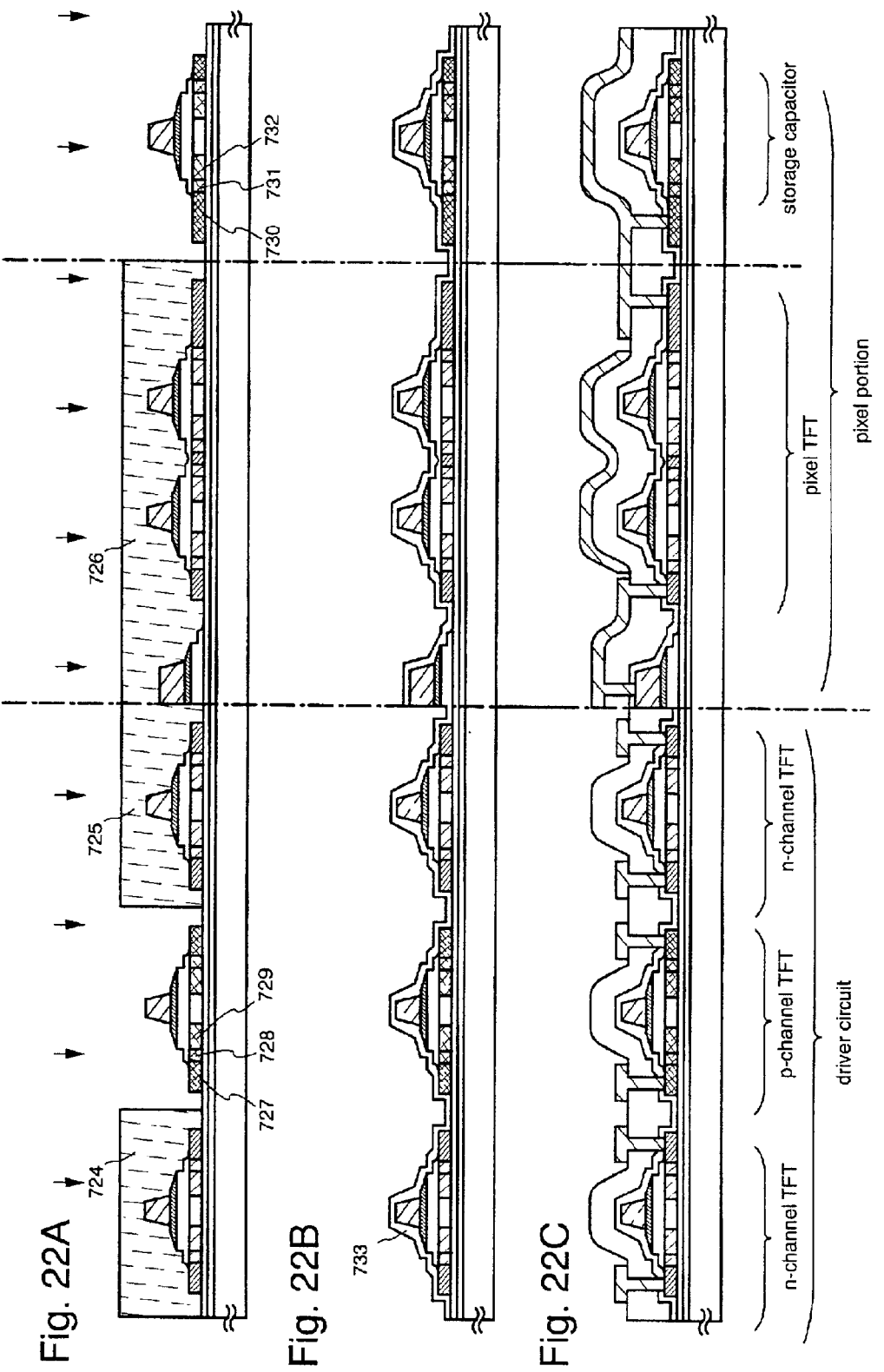
FIGS. 22A, 22B and 22C are views showing steps of fabricating AM-LCD.

Next, as shown in FIG. 22B, there is carried out a step of activating the impurity elements added to the respective semiconductor layers. The activating step is carried out by a thermal annealing process using a furnace annealing furnace. The thermal annealing process may be carried out at 400 through 700° C., representatively, 500 through 550° C. in a nitrogen atmosphere having an oxygen concentration equal to or smaller than 1 ppm, preferably, equal to or smaller than 0.1 ppm and according to the embodiment, the activating process is carried out by a heat treatment at 550° C. for 4 hours. Further, other than the thermal annealing process, a laser annealing process or a rapid thermal annealing process (RTA process) is applicable.

Further, according to the embodiment, simultaneously with the activating process, nickel used as a catalyst in crystallization is gettered by the impurity regions 712 through 716, 727 and 730 including phosphorus at a high concentration and a nickel concentration in the semiconductor layer for mainly constituting a channel forming region is reduced. According to TFT having the channel forming region fabricated in this way, the off current value is reduced, crystallizing performance is excellent and accordingly, high field effect mobility is provided and excellent characteristic can be achieved.

Further, the activating process may be carried out prior to forming the first interlayer insulating film. However, when a used wiring material is weak at heat, it is preferable to carry out the activating process after forming the interlayer insulating film (insulating film having a major component of silicon, for example, silicon nitride film) for protecting the wiring as in the embodiment.

Further, there is carried out a step of hydrogenating the semiconductor layer by carrying out heat treatment at 300 through 550° C. for 1 through 12 hours in an atmosphere including 3 through 100% of hydrogen. According to the embodiment, there is carried out a heat treatment at 410° C. for 1 hour in a nitrogen atmosphere including about 3% of hydrogen. This step is the step of terminating dangling bond of the semiconductor layer by hydrogen included in the interlayer insulating film. As other means of hydrogenation, plasma hydrogenation (using hydrogen excited by plasma) may be carried out.

Further, when a laser annealing process is used as the activating process, after carrying out the hydrogenation, it is preferable to irradiate laser beam such as excimer laser or YAG laser.

Successive steps stay substantially the same as those in Embodiment 1 and by forming wirings connected to the second interlayer insulating film and the respective semiconductor layers in accordance with Embodiment 1, a state of FIG. 22C can be provided.

Further, the liquid crystal display device is provided in accordance with steps of Embodiment 2 by using the active matrix substrate fabricated in the embodiment.

Further, although FIGS. 21A, 21B and 21C and FIGS. 22A, 22B and 22C show steps of fabricating the driver circuit and TFT and the storage capacitor of the pixel portion, when masks are pertinently changed, the pixel portion can be formed with projected portions and the surface of the pixel electrode can be formed with projected and recessed portions as shown in Embodiment 1.

Further, the embodiment can be combined with any of Embodiments 1 through 4.

[Embodiment 7]

Figure 23:
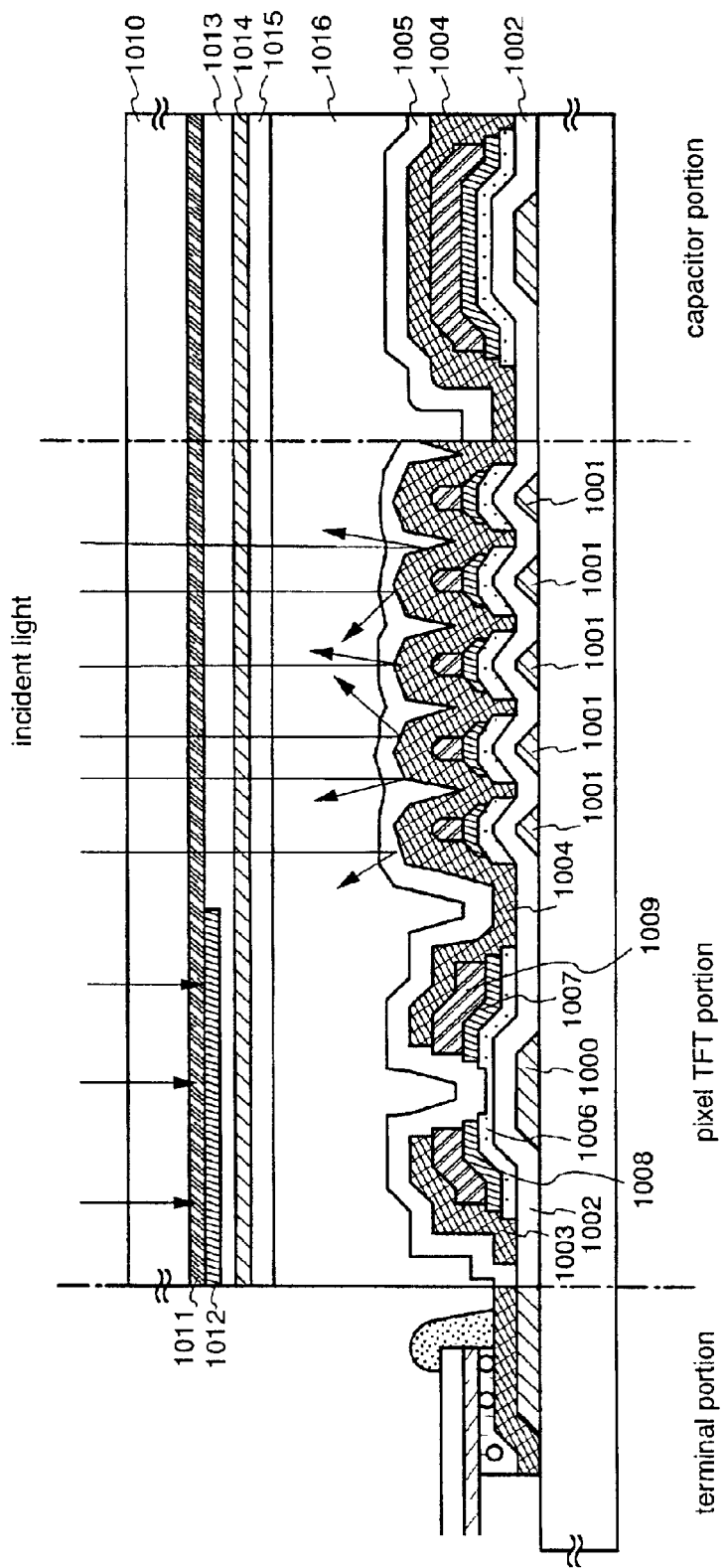
FIG. 23 is a view showing a sectional structure view of an active matrix type liquid crystal display device.

Although according to Embodiment 1, Embodiment 5 and Embodiment 6, there are shown examples of fabricating a pixel electrode using a projected portion simultaneously formed with fabricating TFT of a top gate type, according to the embodiment, a description will be given of an example of fabricating a pixel electrode using a projected portion formed simultaneously with fabricating TFT of an inverse stagger type in reference to FIG. 23 and FIG. 24.

First, a gate wiring 1000 is formed at a first mask (first sheet of photomask). At this occasion, a metal layer 1001 is formed by the same material as that of the gate wiring at a region constituting a display region.

Next, there are successively laminated an insulating film (gate insulating film) 1002, a first amorphous semiconductor film, a second amorphous semiconductor film including an impurity element for providing n-type and a first conductive film to cover the gate wiring 1000 an the metal layer 1001. Further, a micro-crystal semiconductor film may be used in place of the amorphous semiconductor film and a micro-crystal semiconductor film including an impurity element for providing n-type may be used in place of the amorphous semiconductor film including the impurity element for providing n-type. Further, these films can be formed in a plurality of chambers or in the same chamber by using a sputtering process or a plasma CVD process without being exposed to the atmosphere. By preventing these films from being exposed to the atmosphere, impurities can be prevented from mixing.

Next, by a second mask (second sheet of photomask), the first conductive film is patterned to thereby form a wiring comprising the first conductive film (for constituting a source wiring and an electrode (drain electrode) at later step), the second amorphous semiconductor film is patterned to thereby form the second amorphous semiconductor film including the impurity element for providing n-type and the first amorphous semiconductor film is patterned to thereby form the first amorphous semiconductor film. Further, also on an upper side of the metal layer 1001, patterning is carried out similarly to leave the first amorphous semiconductor film and the second amorphous semiconductor film including the impurity element for providing n-type and the first conductive film. According to the patterning, in order to improve coverage of the second conductive film formed in a later step, end portions are etched to constitute a stepped shape as shown in FIG. 23.

Further, shapes of the metal layer 1001 and a laminated object (projected portion) formed thereabove are not particularly limited, a section thereof in the diameter direction may be formed in a polygonal shape or a shape which is not symmetric in left and right direction. For example, there may be used any of the shapes shown by FIGS. 6A through 6G. Further, the metal layer 1001 and the laminated object (projected portion) formed thereabove may be arranged regularly or may be arranged irregularly. Heights of the metal layer 1001 and the laminated object (projected portion) formed thereabove are 0.3 through 3 $\mu$m, preferably, 0.5 through 1.5 $\mu$m.

Next, a resist mask is formed by using a shadow mask at a terminal portion, the insulating film 1002 covering a pad portion of the terminal portion is selectively removed and thereafter, the resist mask is removed. Further, a resist mask may be formed by a screen printing process in place of the shadow mask to thereby constitute an etching mask.

Thereafter, a second conductive film is formed on an entire surface. Further, as the second conductive film, there is used a conductive film having reflectance, for example, a film of a material comprising Al or Ag.

Next, by a third mask (third sheet of photomask), the second conductive film is patterned to thereby form a pixel electrode 1004 comprising the second conductive film, the wiring is patterned to thereby form a source wiring 1003 and an electrode (drain electrode) 1009, the second amorphous semiconductor film including the impurity element for providing n-type is patterned to thereby form a source region 1008 and the drain region 1007 comprising the second amorphous semiconductor film including the impurity element for providing n-type and the first amorphous semiconductor film is partially removed to thereby form a first amorphous semiconductor film 1006.

Next, an alignment film 1005 is formed and a rubbing process is carried out.

By constructing such a constitution, when a pixel TFT portion is fabricated, the number of photomasks used in the photolithography technique can be made three.

In addition thereto, by constructing such a constitution, projected and recessed portions are provided by laminated objects (projected portions) comprising the insulating film formed above the metal layer 1001, the first amorphous semiconductor film, the second amorphous semiconductor film including the impurity element for providing n-type and the first conductive film, the pixel electrode 1004 is formed by covering the projected and recessed portions and accordingly, light scattering performance can be achieved by providing the recessed and projected portions at the surface of the pixel electrode 1004 without increasing the number of fabricating steps.

Next, an opposed substrate shown in Embodiment 2 is prepared. In FIG. 23, numeral 1010 designates the opposed substrate and in accordance with Embodiment 2, there are formed color layers 1011 and 1012 and a leveling film 1013 on the opposed substrate 1010. The color layer 1011 of red color and the color layer 1012 of blue color are formed to overlap partially to thereby form a second light shielding portion. Further, although not illustrated in FIG. 23, the color layer of red color and a color layer of green color are made to overlap partially to thereby form a first light shielding portion.

Next, an opposed electrode 1014 is formed at the pixel portion and an alignment film 1015 is formed on the opposed substrate and subjected to rubbing process.

Further, an active matrix substrate formed with the pixel portion and a driver circuit and the opposed substrate are pasted together by a sealing member. The sealing member is mixed with a filler and two sheets of the substrates are pasted together at a uniform interval therebetween by the filler and columnar spacers. Thereafter, the interval between the two substrates is injected with a liquid crystal material 1016 and is completely sealed by an end-sealing material (not illustrated). A publicly known liquid crystal material may be used for the liquid crystal material 1016. In this way, the active matrix type liquid crystal display device shown in FIG. 23 is completed.

Figure 24:
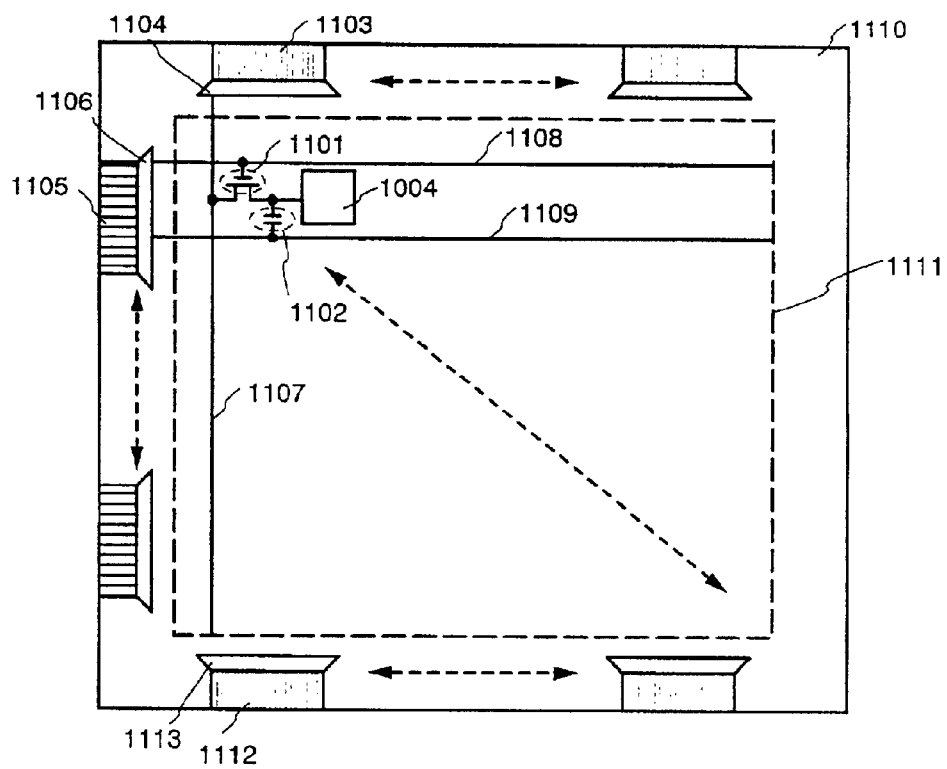
FIG. 24 is a view for explaining an arrangement of a pixel portion and a terminal portion of an active matrix substrate.

FIG. 24 is a view for explaining an arrangement of the pixel portion and the terminal portion of the active matrix substrate. A pixel portion 1111 is provided above a substrate 1110 and at the pixel portion, gate wirings 1108 and source wirings 1107 are formed to intersect with each other and n-channel type TFTs 1101 connected thereto are provided in correspondence with respective pixels. The pixel electrode 1004 and a storage capacitor 1102 are connected to a side of the drain of the n-channel type TFT 1101 and other terminal of the storage capacitor 1102 is connected to a capacitor wiring 1109. Structures of the n-channel type TFT 1101 and the storage capacitor 1102 are the same as those of the n-channel type TFT and the storage capacitor shown by FIG. 23.

At one end portion of the substrate, there is formed an input terminal portion 1105 for inputting a scanning signal and is connected to the gate wiring 1108 by a connection wiring 1106. Further, at other end portion thereof, an input terminal portion 1103 for inputting an image signal is formed and is connected to the source wiring 1107 by a connection wiring 1104. There are provided pluralities of the gate wirings 1108, the source wirings 1107 and the capacitor wirings 1109 in accordance with a pixel density. Further, an input terminal portion 1112 for inputting an image signal and a connection wiring 1113 may be provided to connect to the source wirings alternately with the input terminal portion 1103. The input terminal portions 1103, 1105 and 1112 may be provided respectively by arbitrary numbers, which may pertinently be determined by a person for carrying out the embodiment.

Further, the embodiment can be combined with Embodiment 2 or Embodiment 4.

[Embodiment 8]

In Embodiment 8, an example in which the pixel electrode having unevenness on the surface thereof is formed without increasing the number of manufacturing steps is described. Note that, for simplification, a description will be made of the points which are different from that in Embodiment 7, herein below. Note that the same reference numerals are used for the parts that correspond to FIG. 23.

Figure 25:
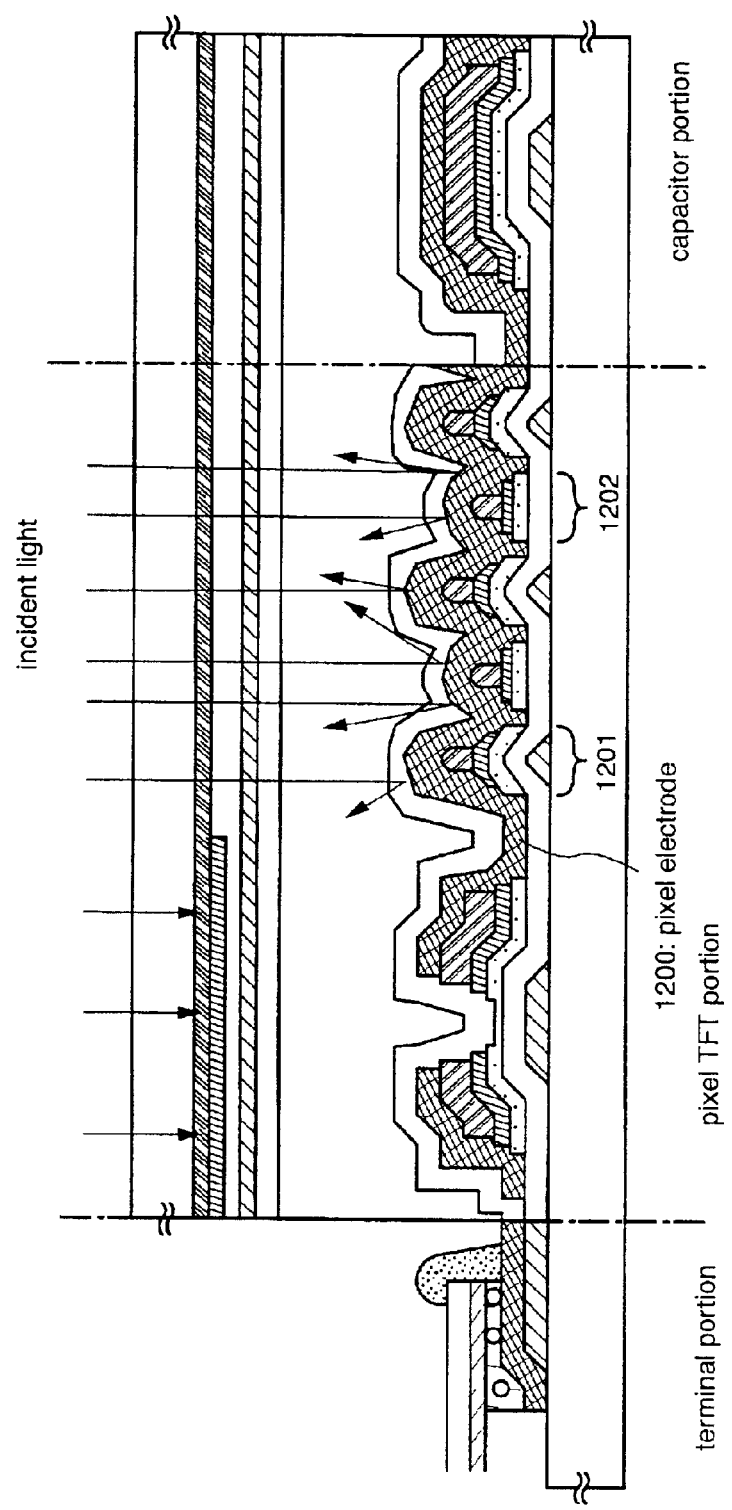
FIG. 25 is a view showing a sectional structure view of an active matrix type liquid crystal display device.

In this example, as shown in FIG. 25, projected portions 1201 and 1202 having different heights are formed.

The projected portions 1201 and 1202 can be formed by changing the mask used in Embodiment 7 without increasing the number of the masks. According to Embodiment 8, as shown in FIG. 25, when patterning is performed on the gate electrode, the mask not forming a metal layer is used at the projected portion 1202. As a result, the height of the projected portion 1202 becomes lower than that of the projected portion 1201 by a thickness of the metal layer. In this embodiment, the mask which has been used for patterning of the metal layer in Embodiment 7 is changed, and two kinds of the projected portions 1201 and 1202 having different height are formed at a portion which becomes a display region.

By taking this measure, the difference of levels of the unevenness formed on the surface of the pixel electrode may be enlarged without increasing the number of manufacturing steps, thereby being capable of further scattering reflection light.

Note that the present embodiment can freely be combined with Embodiment 2 or 4.

[Embodiment 9]

According to the embodiment, there is shown an example of forming a pixel electrode having projected and recessed portions at a surface thereof without increasing the number of fabricating steps. Further, for simplification, an explanation will be given of points different from Embodiment 7 as follows.

Figure 26:
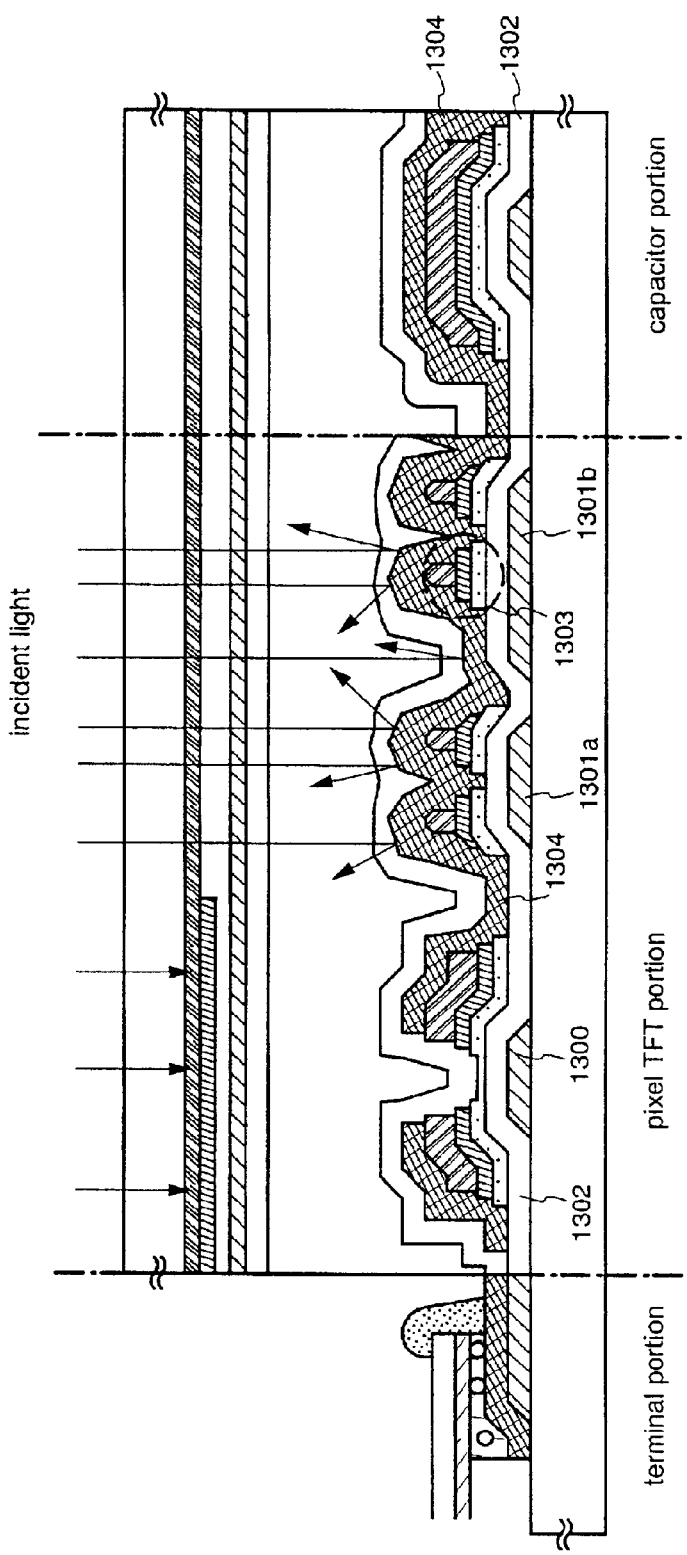
FIG. 26 is a view showing a sectional structure view of an active matrix type liquid crystal display device.

As shown in FIG. 26, the present embodiment is an example in which metal layers 1301*a* and 1301*b* are formed, an insulating film 1302 is formed and thereafter, there are formed laminated objects 1303 comprising a first amorphous semiconductor film, a second amorphous semiconductor film including an impurity element for providing n-type and a first conductive film on the insulating film 1302 at a pitch different from that of the metal layers 1301*a* and 1301*b*.

The metal layers 1301*a* and 1301*b* can be formed by changing the mask of Embodiment 7 without increasing the number of masks. The metal layers 1301*a* and 1301*b* are formed by changing the first mask in forming the gate electrode 1300 of Embodiment 7. Further, the laminated objects 1303 are formed by changing the second mask of Embodiment 7.

Thereby, sizes of the recessed and projected portions formed at the surface of the pixel electrode 1304 can be made to differ from each other, the arrangement can be made random and reflected light can be scattered without increasing the number of steps.

Further, the embodiment can be combined with Embodiment 2, Embodiment 4, Embodiment 7 or Embodiment 8.

[Embodiment 10]

A TFT formed by implementing any one of respective Embodiments 1 to 9 mentioned above is utilized for various electro-optic devices (active matrix liquid crystal display, active matrix EC display). Namely, the present invention can be applied to all of electronic devices incorporating the electro-optic device in its display portion.

The following can be given as examples of such electronic devices: a video camera; a digital camera; a projector (rear type or front type); a head mounted display (a goggle type display); a car navigation system; a car audio system; a personal computer; a portable information terminal (such as a mobile computer, a mobile telephone, or an electronic book). Examples of those electronic devices are shown in FIGS. 27 and 28.

Figure 27A:
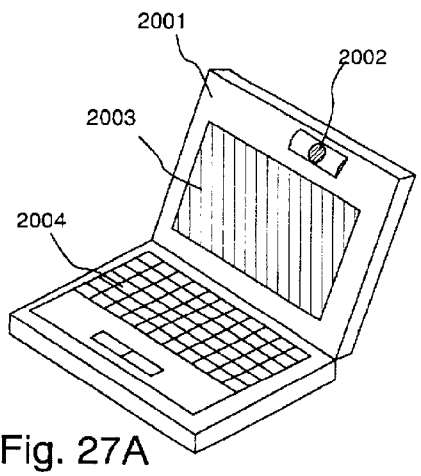
FIGS. 27A, 27B, 27C, 27D, 27E and 27F are views showing examples of electronic device.

FIG. 27A illustrates a personal computer which includes a main body 2001, an image input portion 2002, a display portion 2003, a key board 2004, or the like. The present invention can be applied to the display portion 2003.

Figure 27B:
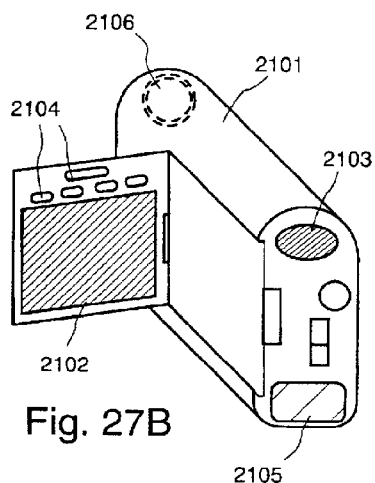

FIG. 27B illustrates a video camera which includes a main body 2101, a display portion 2102, an audio input portion 2103, operation switches 2104, a battery 2105, an image receiving portion 2106, or the like. The present invention can be applied to the display portion 2102.

Figure 27C:
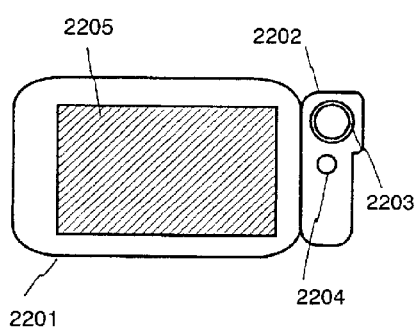

FIG. 27C illustrates a mobile computer which includes a main body 2201, a camera section 2202, an image receiving section 2203, operation switches 2204, a display portion 2205, or the like. The present invention can be applied to the display portion 2205.

Figure 27D:
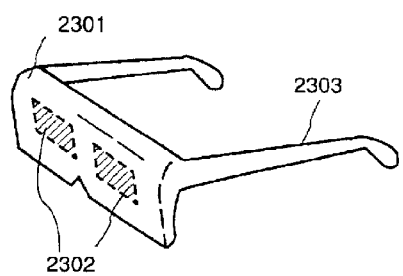

FIG. 27D illustrates a goggle type display which includes a main body 2301, a display portion 2302, and an arm section 2303. The present invention can be applied to the display portion 2302.

Figure 27E:
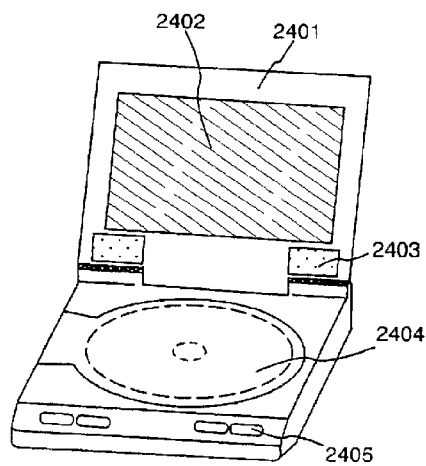

FIG. 27E illustrates a player using a recording medium which records a program (hereinafter referred to as a recording medium) and includes a main body 2401, a display portion 2402, a speaker section 2403, a recording medium 2404, and operation switches 2405. This device uses DVD (digital versatile disc), CD, etc. for the recording medium, and can be used for music appreciation, film appreciation, games and Internet. The present invention can be applied to the display portion 2402.

Figure 27F:
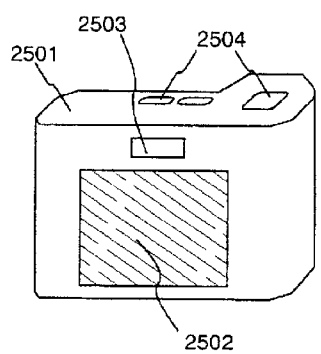

FIG. 27F illustrates a digital camera which includes a main body 2501, a display portion 2502, a view finder 2503, operation switches 2504, and an image receiving section (not shown in the figure). The present invention can be applied to the display portion 2502.

Figure 28A:
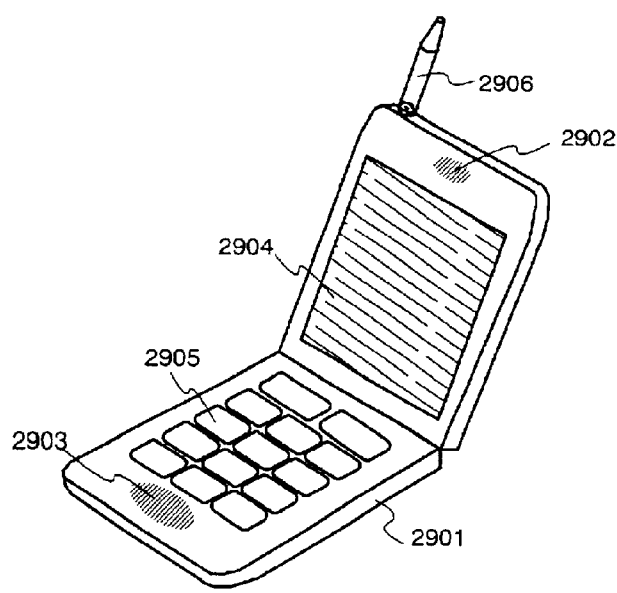
FIGS. 28A, 28B, and 28C are views showing examples of electronic device.

FIG. 28A illustrates a portable telephone which includes a main body 2901, a voice output portion 2902, a voice input portion 2903, a display portion 2904, operation switches 2905, and an antenna 2906. The present invention can be applied to the display portion 2904.

Figure 28B:
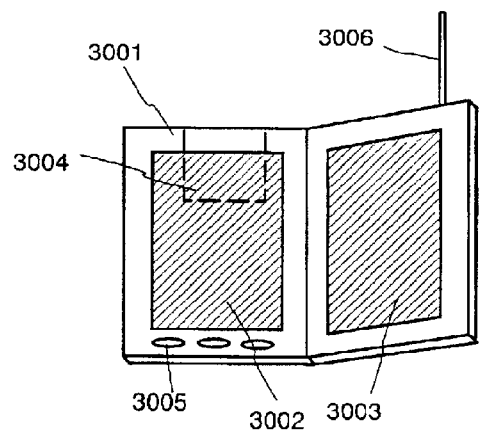

FIG. 28B illustrates a portable electronic book which includes a main body 3001, display portions 3002 and 3003, a memory medium 3004, an operation switch 3005 and an antenna 3006. The present invention can be applied to the display portions 3002 and 3003.

Figure 28C:
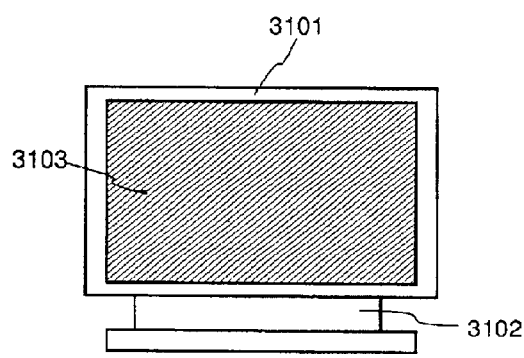

FIG. 28C illustrates a display which includes a main body 3101, a support stand 3102, and a display portion 3103, etc. The present invention can be applied to the display portion 3103. The display of the present invention is advantageous for a large size screen in particular, such as a display equal to or greater than 10 inches (especially equal to or greater than 30 inches) in the opposite angle.

As mentioned above, the application range of the present invention is extremely wide, and the invention can be applied to electronic devices in all fields. Further, any constitution of the electronic devices shown in Embodiments 1 to 9 may be employed in Embodiment 10.

According to the invention, there can be formed a pixel electrode having projected and recessed portions at a surface thereof without increasing the number of steps.

What is claimed is:

1. A semiconductor device comprising:
   a thin film transistor comprising a semiconductor layer over a substrate and a gate electrode with an insulating film interposed therebetween;
   a plurality of projected portions over said substrate;
   an interlayer insulating film covering said thin film transistor and said plurality of projected portions, said interlayer insulating film having a projected and recessed surface; and
   a pixel electrode electrically connected to said thin film transistor, said pixel electrode having a projected and recessed surface on said interlayer insulating film,
   wherein said projected surface of said pixel electrode has a radius of curvature from 0.1 to 4 µm.

2. The semiconductor device according to claim 1, wherein said projected portions comprise a same material as one selected from the group consisting of a semiconductor layer, a gate electrode, and a gate insulating film of said thin film transistor.

3. The semiconductor device according to claim 1, wherein said projected portions have different heights or different shapes.

4. The semiconductor device according to claim 1, wherein said pixel electrode comprises one selected from the group consisting of Al, Ag, and a lamination of Al and Ag.

5. The semiconductor device according to claim 1, further comprising a first light shielding portion comprising laminated layers of a first color layer and a second color layer; and
   a second light shielding portion comprising laminated layers of said first color layer and a third color layer;
   wherein said first light shielding portion and said second light shielding portion are formed to overlap in an interval between an arbitrary one of said pixel electrode and said pixel electrode contiguous to said arbitrary one of said pixel electrode.

6. The semiconductor device according to claim 5, wherein said first color layer comprises a red color, said second color layer comprises a blue color, and said third color layer comprises a green color.

7. The semiconductor device according to claim 5, wherein said first light shielding portion and said second light shielding portion are provided over an opposed substrate.

8. The semiconductor according to claim 1, wherein said semiconductor device is a reflection type liquid crystal display device.

9. The semiconductor device according to claim 1, wherein said semiconductor device is at least one selected from the group consisting of a personal computer, a video camera, a mobile computer, a portable telephone, a goggle-type display, a digital camera, a player using a recording medium, and a portable electronic book.

10. A semiconductor device comprising:
    a thin film transistor comprising a semiconductor layer on an insulating surface, an insulating film on said semiconductor layer and a gate electrode on said insulating film;
    a plurality of projected portions on said insulating surface;
    a pixel electrode having a projected and recessed surface, and electrically connected to said thin film transistor,
    wherein said projected surface of said pixel electrode has a radius of curvature from 0.1 to 4 µm.

11. The semiconductor device according to claim 10, wherein said projected portions comprise a same material as one selected from the group consisting of a semiconductor layer, a gate electrode, and a gate insulating film of said thin film transistor.

12. The semiconductor device according to claim 10, wherein said projected portions have different heights or different shapes.

13. The semiconductor device according to claim 10, wherein said pixel electrode comprises one selected from the group consisting of Al, Ag, and a lamination of Al and Ag.

14. The semiconductor device according to claim 10, further comprising a first light shielding portion comprising laminated layers of a first color layer and a second color layer; and
    a second light shielding portion comprising laminated layers of said first color layer and a third color layer;

wherein said first light shielding portion and said second light shielding portion are formed to overlap in an interval between an arbitrary one of said pixel electrode and said pixel electrode contiguous to said arbitrary one of said pixel electrode.

15. The semiconductor device according to claim 14, wherein said first color layer comprises a red color, said second color layer comprises a blue color, and said third color layer comprises a green color.

16. The semiconductor device according to claim 14, wherein said first light shielding portion and said second light shielding portion are provided over an opposed substrate.

17. The semiconductor according to claim 10, wherein said semiconductor device is a reflection type liquid crystal display device.

18. The semiconductor device according to claim 10, wherein said semiconductor device is at least one selected from the group consisting of a personal computer, a video camera, a mobile computer, a portable telephone, a goggle-type display, a digital camera, a player using a recording medium, and a portable electronic book.

19. A semiconductor device comprising:
   a thin film transistor comprising a semiconductor layer over a substrate and a gate electrode with an insulating film interposed therebetween;
   a plurality of projected portions over said substrate;
   an interlayer insulating film covering said thin film transistor and said plurality of projected portions, said interlayer insulating film having a projected and recessed surface; and
   a pixel electrode electrically connected to said thin film transistor, said pixel electrode having a projected and recessed surface on said interlayer insulating film,
   wherein said projected surface of said pixel electrode has a radius of curvature from 0.1 to 4 µm.

20. The semiconductor device according to claim 19, wherein said projected portions have different heights or different shapes.

21. The semiconductor device according to claim 19, wherein said pixel electrode comprises one selected from the group consisting of Al, Ag, and a lamination of Al and Ag.

22. The semiconductor device according to claim 19, further comprising a first light shielding portion comprising laminated layers of a first color layer and a second color layer; and
   a second light shielding portion comprising laminated layers of said first color layer and a third color layer;
   wherein said first light shielding portion and said second light shielding portion are formed to overlap in an interval between an arbitrary one of said pixel electrode and said pixel electrode contiguous to said arbitrary one of said pixel electrode.

23. The semiconductor device according to claim 22, wherein said first color layer comprises a red color, said second color layer comprises a blue color, and said third color layer comprises a green color.

24. The semiconductor device according to claim 22, wherein said first light shielding portion and said second light shielding portion are provided over an opposed substrate.

25. The semiconductor according to claim 19, wherein said semiconductor device is a reflection type liquid crystal display device.

26. The semiconductor device according to claim 19, wherein said semiconductor device is at least one selected from the group consisting of a personal computer, a video camera, a mobile computer, a portable telephone, a goggle-type display, a digital camera, a player using a recording medium, and a portable electronic book.

27. A semiconductor device comprising:
   a thin film transistor comprising a semiconductor layer on an insulating surface, an insulating film on said semiconductor layer and a gate electrode on said insulating film;
   a plurality of projected portions on said insulating film;
   a pixel electrode having a projected and recessed surface, and electrically connected to said thin film transistor,
   wherein said projected surface of said pixel electrode has a radius of curvature from 0.1 to 4 µm.

28. The semiconductor device according to claim 27, wherein said projected portions comprise a same material as a gate electrode of said thin film transistor.

29. The semiconductor device according to claim 27, wherein said projected portions have different heights or different shapes.

30. The semiconductor device according to claim 27, wherein said pixel electrode comprises one selected from the group consisting of Al, Ag, and a lamination of Al and Ag.

31. The semiconductor device according to claim 27, further comprising a first light shielding portion comprising laminated layers of a first color layer and a second color layer; and
   a second light shielding portion comprising laminated layers of said first color layer and a third color layer;
   wherein said first light shielding portion and said second light shielding portion are formed to overlap in an interval between an arbitrary one of said pixel electrode and said pixel electrode contiguous to said arbitrary one of said pixel electrode.

32. The semiconductor device according to claim 31, wherein said first color layer comprises a red color, said second color layer comprises a blue color, and said third color layer comprises a green color.

33. The semiconductor device according to claim 31, wherein said first light shielding portion and said second light shielding portion are provided over an opposed substrate.

34. The semiconductor according to claim 27, wherein said semiconductor device is a reflection type liquid crystal display device.

35. The semiconductor device according to claim 27, wherein said semiconductor device is at least one selected from the group consisting of a personal computer, a video camera, a mobile computer, a portable telephone, a goggle-type display, a digital camera, a player using a recording medium, and a portable electronic book.

* * * * *